United States Patent [19]

Tagawa

[11] Patent Number: 5,534,892
[45] Date of Patent: Jul. 9, 1996

[54] DISPLAY-INTEGRATED TYPE TABLET DEVICE HAVING AND IDLE TIME IN ONE DISPLAY IMAGE FRAME TO DETECT COORDINATES AND HAVING DIFFERENT ELECTRODE DENSITIES

[75] Inventor: Takao Tagawa, Kashihara, Japan

[73] Assignee: Sharp Kabushiki Kaisha, Osaka, Japan

[21] Appl. No.: 203,006

[22] Filed: Feb. 28, 1994

[30] Foreign Application Priority Data

May 20, 1992 [JP] Japan .................................. 4-127255
Mar. 11, 1993 [JP] Japan .................................. 5-050539

[51] Int. Cl.$^6$ .................................................. G09G 5/00
[52] U.S. Cl. ......................... 345/173; 345/174; 345/104; 178/18
[58] Field of Search ............................ 345/104, 173–180, 345/103; 178/18, 19

[56] References Cited

U.S. PATENT DOCUMENTS

| | | | |
|---|---|---|---|
| 4,839,634 | 6/1989 | More et al. | 340/712 |
| 4,841,290 | 6/1989 | Nakano et al. | 340/707 |
| 4,985,698 | 1/1991 | Mano et al. | 345/103 |
| 5,136,282 | 8/1992 | Inaba et al. | 347/103 |
| 5,162,782 | 11/1992 | Yoshieka | 345/104 |
| 5,283,556 | 2/1994 | Ise | 345/174 |
| 5,410,329 | 4/1995 | Tagawa et al. | 345/104 |

FOREIGN PATENT DOCUMENTS 54-24538 2/1979 Japan .
5-324167 12/1993 Japan .

*Primary Examiner*—Ulysses Weldon
*Assistant Examiner*—Matthew Luu
*Attorney, Agent, or Firm*—David G. Conlin; Milton Oliver

[57] ABSTRACT

There is provided a display-integrated type tablet device which can achieve a high coordinate detection accuracy even when an electrode density of electrodes is greater than a electrode density of the other electrodes in a display panel. A segment electrode scanning clock signal for scanning segment electrodes having an electrode density three times as high as that of common electrodes has a frequency three times as high as a common electrode scanning clock signal. Shift data input to a segment electrode drive circuit has the same pulse width as that of the shift data input to a common electrode drive circuit. As a result, a scanning speed in an x-direction (shift speed of a segment electrode scanning signal) can be made approximately equal to a scanning speed in a y-direction (shift speed of a common electrode scanning signal). Furthermore, the width of the segment electrodes in an active state is made equal to the width of the common electrode. Thus a waveform of a voltage induced at a detection electrode of a detection pen in an x-coordinate detection period and a waveform of a voltage induced in a y-coordinate detection period are made approximately equal to each other to obtain a high coordinate detection accuracy.

5 Claims, 23 Drawing Sheets

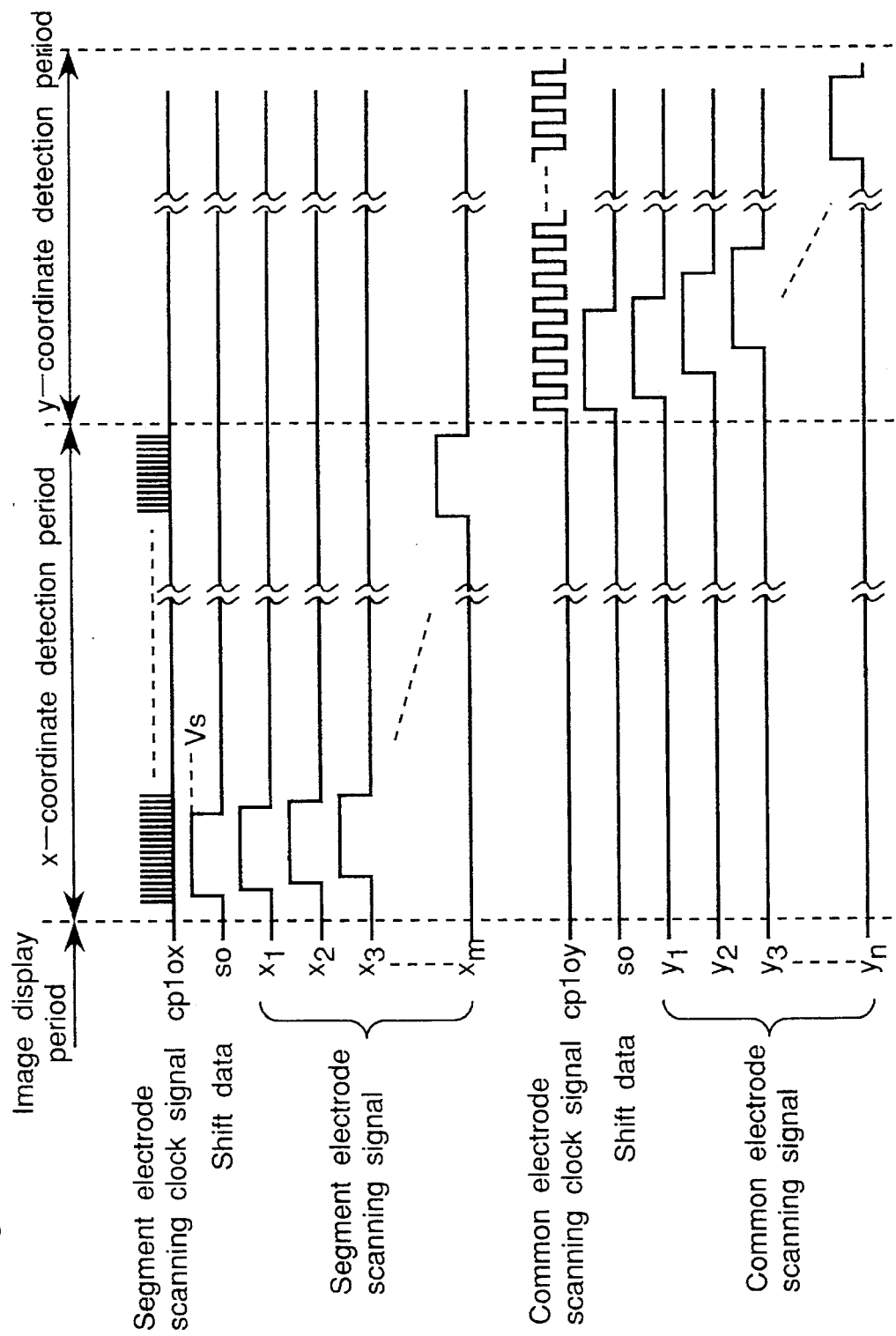

206a Clock signal generating section

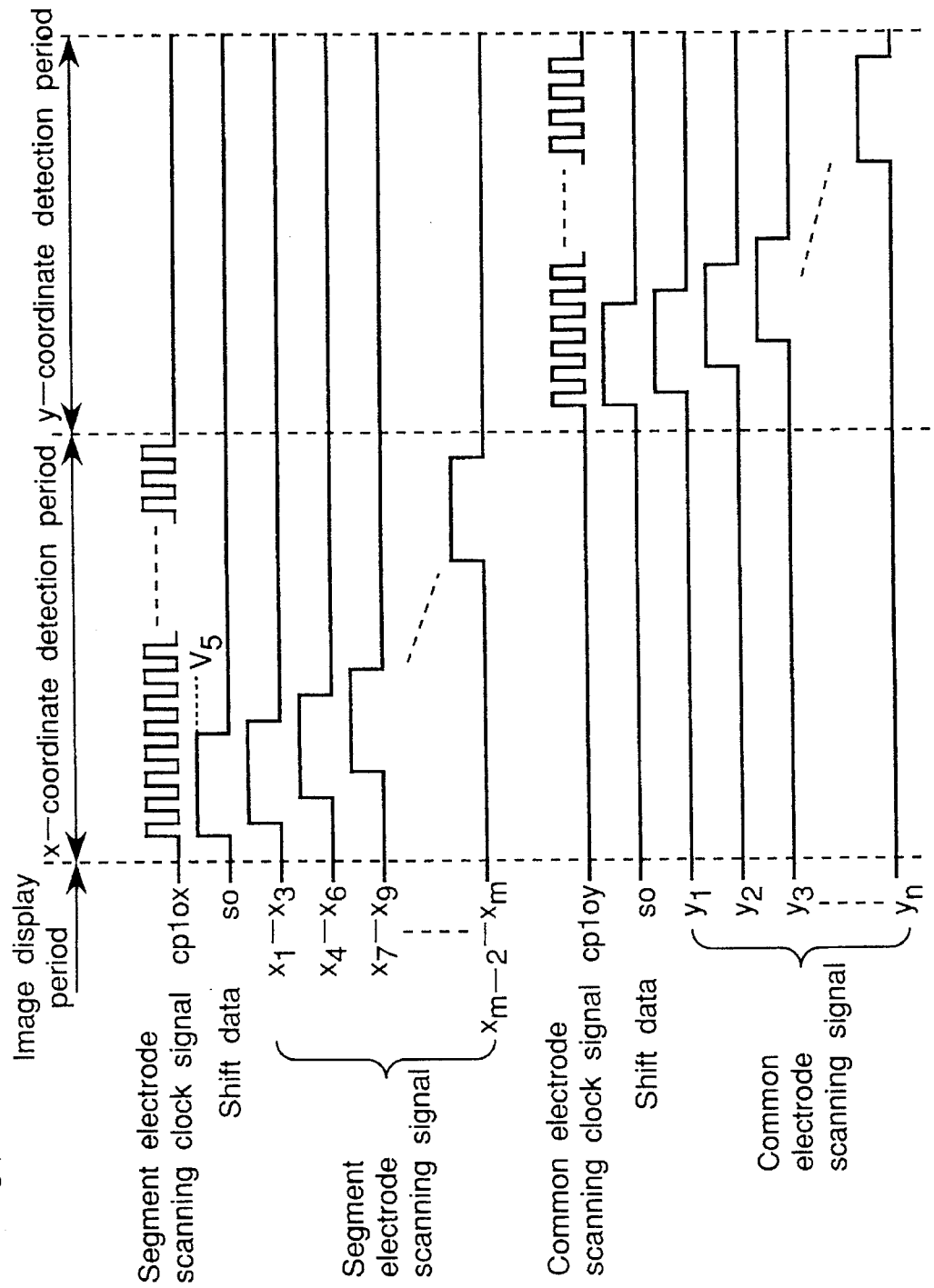

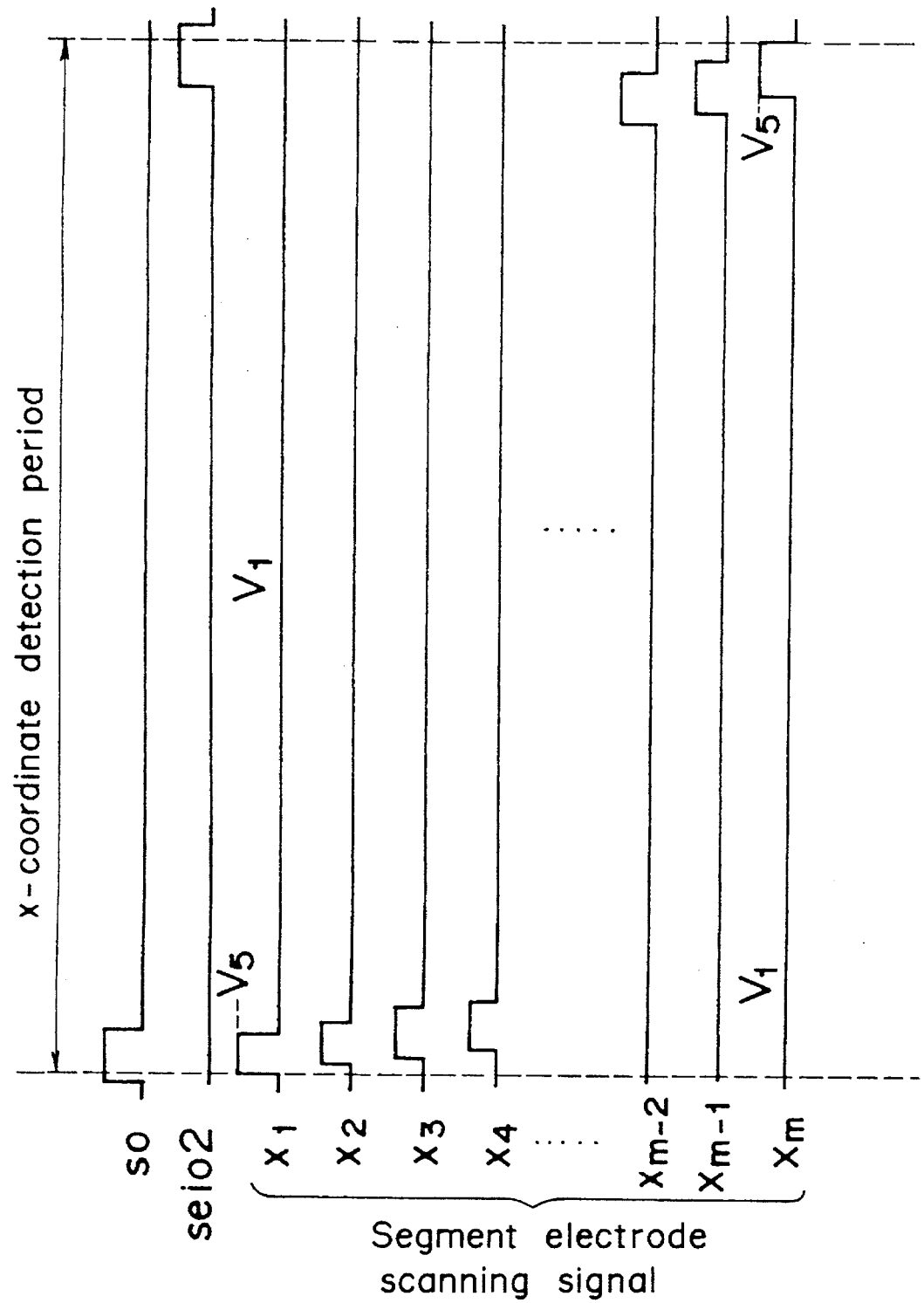

DISPLAY-INTEGRATED TYPE TABLET DEVICE HAVING AND IDLE TIME IN ONE DISPLAY IMAGE FRAME TO DETECT COORDINATES AND HAVING DIFFERENT ELECTRODE DENSITIES

BACKGROUND OF THE INVENTION

The present invention relates to a display-integrated type tablet device for use in a personal computer, a word processor, and the like.

As a means for inputting a handwritten letter or a figure into a computer or a word processor, there has been put into practical use a display-integrated type tablet device which is formed by laminating an electrostatic induction type tablet on a liquid crystal display and is capable of receiving an input of a letter or a figure into its electrostatic induction type tablet as if the letter or figure were written on a paper by writing implements. However, in such a display-integrated type tablet device, electrodes are viewed as a grating on the display screen due to a difference in reflectance or transmission between a portion having an electrode and a portion having no electrode, which has been a cause of degrading the quality of an image displayed on the liquid crystal display screen.

As a tablet free of the above-mentioned drawback, lately the inventor of the present invention has proposed a display-integrated type tablet device as shown in FIG. 14 (Japanese Patent Laid-Open Publication No. HEI 5-53726 issued on Mar. 5, 1993).

The above-mentioned display-integrated type tablet device is not a prior art to be referred to, however, it is described for the purpose to allow the present invention to be more understandable.

The above-mentioned display-integrated type tablet device has electrodes which concurrently serve as image display electrodes of a liquid crystal display (LCD) and as coordinate detection electrodes of an electrostatic type tablet device. There are provided in one frame period a coordinate detection period when designated coordinates on the tablet are detected and an image display period when an image is displayed as shown in FIG. 15 to time-sharingly execute the coordinate detection and image display.

Referring to FIG. 14, an LCD panel 1 is constructed by interposing liquid crystals between common electrodes $Y_1$ through $Y_n$ (an arbitrary common electrode represented by Y hereinafter) and segment electrodes $X_1$ through $X_m$ (an arbitrary segment electrode represented by X hereinafter) which are arranged at right angles to each other, in which each portion where a common electrode Y and a segment electrode X intersect each other constitutes each pixel. In other words, n×m dot pixels are arranged in matrix in the LCD panel 1.

It is noted that the numbers n and m are determined to be n=480 and m=640 in a liquid crystal display panel for use in a personal computer with a monochrome display.

The above-mentioned display-integrated type tablet device has an advantage of permitting cost reduction as well as compact and light weight design by virtue of the concurrent use of the electrodes and drive circuits as those of the liquid crystal display and those of the electrostatic induction type tablet in addition to an advantage of making the grating-shaped electrodes invisible for a better image presentation in contrast to the conventional type formed by laminating the electrostatic induction type tablet on the liquid crystal display.

The above-mentioned display-integrated type tablet device operates in a manner as follows. A common electrode drive circuit 2 for driving the common electrode Y and a segment electrode drive circuit 3 for driving the segment electrode X are connected to a display control circuit 5 and a detection control circuit 6 via a switching circuit 4. The switching circuit 4 is controlled by a control circuit 7 so that it outputs an output signal from the display control circuit 5 to the common electrode drive circuit 2 and the segment electrode drive circuit 3 in an image display period and outputs an output from the detection control circuit 6 to the common electrode drive circuit 2 and the segment electrode drive circuit 3 in a coordinate detection period.

Although the switching circuit 4, the display control circuit 5, the detection control circuit 6, and the control circuit 7 are expressed as separated blocks in FIG. 14, the circuits are composed of an LSI (Large Scale Integrated) circuit in practice. Therefore, the LSI cannot be strictly sectioned into such blocks in a practical circuit arrangement.

In the image display period, firstly a mode signal (mode) output from the control circuit 7 to the segment electrode drive circuit 3 and the switching circuit 4 is switched to the image display mode. Then the segment electrode drive circuit 3 selects the image display mode, and the switching circuit 4 is switched so as to select the output signal from the display control circuit 5.

Then there are output, from the display control circuit 5, shift data s from a shift data output terminal S, an inverted signal fr from an inverted signal output terminal FR, a clock signal cp1 from a clock output terminal CP1, a clock signal cp2 from a clock output terminal CP2, and display data $D_0$ through $D_3$ from data output terminals D0 through D3.

The clock signal cp1 is a clock signal which has a period when pixels in one line display an image, and the signal is input as a clock signal cp1o to a clock input terminal YCK of the common electrode drive circuit 2 and a latch pulse input terminal XLP of the segment electrode drive circuit 3 via an output terminal CP1O of the switching circuit 4. The shift data s which is a pulse signal for selecting a specified common electrode Y is input as shift data so to a shift data input terminal DIO1 of the common electrode drive circuit 2 in synchronization with the clock signal cp1o via an output terminal SO of the switching circuit 4.

When the shift data so is input to the common electrode drive circuit 2, the pulse position of the shift data so is shifted in a shift register built in the common electrode drive circuit 2 in synchronization with the clock signal cp1o, and drive pulses of a common electrode drive signal are applied to the common electrodes $Y_1$ through $Y_n$ from output terminals O1 through On of the common electrode drive circuit 2 in correspondence with the shift position. The common electrode drive signal is generated based on bias power sources $V_0$ through $V_5$ supplied from a DC power supply circuit 12.

The clock signal cp2 is a clock signal which has a period being a division of a period when pixels in one line displays an image, and the signal is input as a clock signal cp2o to a clock input terminal XCK of the segment electrode drive circuit 3 via an output terminal CP2O of the switching circuit 4.

The image display data $D_0$ through $D_3$ are input as display data $D_0$o through $D_3$o to input terminals XD0 through XD3 of the segment electrode drive circuit 3 via output terminals D0O through D3O of the switching circuit 4, and then successively taken into a register in the segment electrode drive circuit 3 in synchronization with the clock signal cp2o.

When all the display image data corresponding to the pixels in one line are taken in, the display data taken in are latched at a timing of the clock signal cp1o input to the latch pulse input terminal XLP. Then drive pulses of the segment electrode drive signal corresponding to the display data are applied from output terminals O1 through Om of the segment electrode drive circuit 3 to the segment electrodes $X_1$ through $X_m$. The segment electrode drive signal is also generated based on the bias power sources $V_0$ through $V_5$ supplied from the DC power supply circuit 12.

It is noted that the inverted signal fr is a signal for preventing possible deterioration of the liquid crystals due to electrolysis by periodically inverting the direction of voltage application to the liquid crystals in the image display period. The inverted signal fr is input as an inverted signal fro to an inverted signal input terminal YFR of the common electrode drive circuit 2 and an inverted signal input terminal XFR of the segment electrode drive circuit 3 via an inverted signal output terminal FRO of the switching circuit 4.

Thus the pixel matrix of the LCD panel 1 is line-sequentially driven by the operations of the common electrode drive circuit 2 and the segment electrode drive circuit 3 to display an image corresponding to the display data $D_0$ through $D_3$ on the LCD panel 1.

In the coordinate detection period, firstly the mode signal (mode) output from the control circuit 7 to the segment electrode drive circuit 3 and the switching circuit 4 is switched to the coordinate detection mode. Then the segment electrode drive circuit 3 selects the coordinate detection mode, and the switching circuit 4 is switched so as to select the output signal from the detection control circuit 6.

Then there are output, from the detection control circuit 6, shift data sd from a shift data output terminal Sd, an inverted signal frd from an inverted signal output terminal FRd, a clock signal cp1d from a clock output terminal CP1d, a clock signal cp2d from a clock output terminal CP2d, and drive data $D_0d$ through $D_3d$ from data output terminals D0d through D3d.

The clock signal cp1d is a clock signal which has a period when one common electrode Y is scanned, and the signal is input as the clock signal cp1o to the clock input terminal YCK of the common-electrode drive circuit 2 and the latch pulse input terminal XLP of the segment electrode drive circuit 3 via the output terminal CP1O of the switching circuit 4. Meanwhile, the shift data sd which is a pulse signal for selecting a specified common electrode Y is input as the shift data (so) to the shift data input terminal DIO1 of the common electrode drive circuit 2 or a shift data input terminal EIO1 of the segment electrode drive circuit 3 via the output terminal SO of the switching circuit 4 in synchronization with the clock signal cp1d.

Then, in the same manner as in the image display period described above, the position of the shift data (so) input to the common electrode drive circuit 2 is shifted in the shift register of the common electrode drive circuit 2 in synchronization with the clock signal cp1o, and scanning pulses of common electrode drive signals $Y_1$ through $Y_n$ (arbitrary common electrode scanning signal represented by y hereinafter) are successively applied from the output terminals O1 through On corresponding to the shift position to the common electrodes $Y_1$ through $Y_n$. The common electrode scanning signal y is generated based on the bias power sources $V_0$ through $V_5$ supplied from the DC power supply circuit 12.

The clock signal cp2d is a clock signal which has a period when the segment electrode X is scanned, and the signal is input as the clock signal cp2o to the clock input terminal XCK of the segment electrode drive circuit 3 via the output terminal CP2O of the switching circuit 4.

The drive data $D_0d$ through $D_3d$ are input as drive data $D_0o$ through $D_3o$ to the input terminals XD0 through XD3 of the segment electrode drive circuit 3 via the output terminals D0O through D3O of the switching circuit 4, and then successively taken into the register of the segment electrode drive circuit 3 in synchronization with the clock signal cp2o. Then scanning pulses of the segment electrode scanning signals $x_1$ through $x_m$ (arbitrary segment electrode scanning signal represented by x hereinafter) corresponding to the drive data are output from the output terminals O1 through Om of the segment electrode drive circuit 3 to the segment electrodes $X_1$ through $X_m$. The segment electrode scanning signal x is also generated based on the bias power sources $V_0$ through $V_5$ supplied from the DC power supply circuit 12.

FIG. 16 is a timing chart of the scanning signals in the coordinate detection period of the display-integrated type tablet device. The coordinate detection period is separated into an x-coordinate detection period and a subsequent y-coordinate detection period. In the x-coordinate detection period, the segment electrode scanning signal x which is a pulse voltage signal is sequentially applied to the segment electrode X. In the y-coordinate detection period, the common electrode scanning signal y which is a pulse voltage signal is sequentially applied to the common electrode Y.

With the application of the pulse voltage signals, a voltage is induced at a designation coordinate detection pen (referred to merely as the "detection pen" hereinafter) 8 due to a stray capacitance between the segment electrode X or the common electrode Y and a tip electrode of the detection pen 8. The voltage induced at the detection pen 8 is amplified in an amplifier 9 and then input to an x-coordinate detection circuit 10 and a y-coordinate detection circuit 11.

The x-coordinate detection circuit 10 and the y-coordinate detection circuit 11 respectively detect an x-coordinate value and a y-coordinate value of a position pointed by the detection pen 8 by detecting a period from the time when the pulse voltage signal is applied to the time when an induction voltage takes its maximum value based on an output signal from the amplifier 9 and a timing signal from the control circuit 7.

It is required to reduce the duration of the coordinate detection period as short as possible in order to allow the duration of the image display period to be as long as possible. Therefore, a segment electrode scanning speed and a common electrode scanning speed in the coordinate detection period are made higher than the drive speed of each electrode in the image display period.

Although the display-integrated type tablet device have the aforementioned advantages, it still has several problems as follows.

[First problem]

In the aforementioned display-integrated type tablet device, there is provided a coordinate detection period for detecting the coordinates at the tip end of the detection pen 8 on the LCD panel 1 in between the image display period of the Nth frame and the image display period of the (N+1)th frame. In contrast to the above, in a normal LCD panel having no tablet function, there is of course existing no coordinate detection period in each frame to continue the image display periods.

Therefore, in applying the display-integrated type tablet device to a personal computer, a word processor, or the like, it is required to develop a display control circuit which can set up a coordinate detection period in place of a conventional display control circuit which cannot set up any coordinate detection period.

The above fact is not problematic when the apparatus employing the display-integrated type tablet device is a new apparatus and fairly large quantity production is expected. However, in the case where the display-integrated type tablet device is mounted to a conventionally manufactured personal computer or the like having no tablet function in a minor change manner and little demand is expected, it is problematic to newly develop a display control circuit in terms of cost and the performance such as reliability of the display control circuit.

Therefore, in the latter case, it is desirable to make the LCD panel function as a display-integrated type tablet device by utilizing the conventionally manufactured display control circuit for the LCD panel having no tablet function and merely incorporating a detection pen, a detection control circuit, a switching circuit, x- and y-coordinate detection circuits, a control circuit, and the like into the LCD panel.

[Second problem]

In the aforementioned display-integrated type tablet device, there is provided a coordinate detection period for detecting the coordinates at the tip end of the detection pen on the LCD panel in between the image display period of the Nth frame and the image display period of the (N+1)th frame in a manner as described hereinbefore. Therefore, the frequency of detecting coordinates in one second (referred to as the "coordinate detection frequency" hereinafter) in the display-integrated type tablet device is equal to the frequency of frames in image display.

The frequency of frames in image display in a personal computer, word processor, or the like has been normally set in a manner as follows.

In the case of a reflection type LCD panel having no back light source and designed as an energy-saving model, for the purpose to avoid flicker due to a fluorescent lamp for room illumination, the frame frequency is determined to be 50 frames per second in a version for use in a district where a 50 Hz power is used, 60 frames per second in a version for use in a district where a 60 Hz power is used, and 72 frames per second in a version for common use in both the districts.

In the case where a fluorescent lamp lit at a high frequency is used for room illumination or in the case of an LCD panel having a back light source, there is no need to take the flicker into account. Therefore, to reduce the power consumption of the LCD panel as low as possible and in view of a compatibility with the display which has been used (e.g., CRT (Cathode Ray Tube) display), the frame frequency is determined to be 60 frames per second or lower.

As described above, the coordinate detection frequency in the display-integrated type tablet device is equal to the number of frames in image display. Therefore, the coordinate detection frequency in the case where the display-integrated type tablet device is adopted for a personal computer, a word processor, or the like, is 72 cycles per second at maximum or 60 cycles per second in almost all the cases.

Although it is theoretically possible to further increase the frame frequency, the frequency of 72 cycles per second can be considered as the higher limit in practical apparatuses in regard to the compatibility with the existing models and the increase of power consumption.

The coordinate detection frequency value (72 cycles per second at maximum, 60 cycles per second normally) of the detection pen is sufficient in pointing a position on the LCD panel by means of the detection pen in the time of menu selection by an icon or when a handwritten letter is input at normal speed to be recognized. However, when a high-speed handwritten pattern is input to be recognized or when a coordinate value is obtained by averaging values detected in several times, a coordinate detection frequency higher than the above-mentioned frequency is desired.

For instance, when a letter or a symbol written at high speed is desired to be detected at a higher rate of recognition, a coordinate detection frequency of 100 cycles per second is sometimes required.

[Third problem]

In the aforementioned display-integrated type tablet device, it is preferred to provide a longer image display period by reducing the coordinate detection period as far as possible to keep a high display image quality. For instance, the duration of the coordinate detection period in the case where the frequency of frames in image display is 60 frames per second is 0.4 mS to 0.8 mS. However, even when the coordinate detection period is thus short, the segment electrode scanning and the common electrode scanning as shown in FIG. 15 must be securely executed. Therefore, the scanning speed of each electrode is very high, when the frequency of the clock signal cp1o reaches 3 MHz.

The segment electrode X or the common electrode Y of the display-integrated type tablet device as shown in FIG. 14 can be expressed by an equivalent circuit consisting of capacitors C and resistors R as shown in FIG. 17 when viewed from the side of the segment electrode drive circuit 3 or the common electrode drive circuit 2.

The capacitors C are electrostatic capacitances between the segment electrodes X and the common electrodes Y which intersect each other with interposition of liquid crystals, where the capacitance reaches 1 pF per pixel in the case of a pixel of 0.33 mm square. The resistors R are the resistances of the segment electrodes X and the common electrodes Y, where the resistance reaches several tens ohms per pixel in the case of a normal LCD panel.

Applying a scanning pulse having a voltage $V_s$ to the common electrode Y by the common electrode drive circuit 2 in the coordinate detection period is equivalent to applying a scanning pulse having the voltage $V_s$ to the CR circuit as shown in FIG. 17.

The CR circuit shown in FIG. 17 is a sort of a low-pass filter which deforms the waveform of a scanning pulse applied to the leftmost end of the CR circuit according as the pulse is transmitted rightward and delays the propagation time of the pulse. In the above case, when the scanning speed of the common electrode drive circuit 2 is slow, the propagation delay causes no substantial problem since the delay time is shorter than the coordinate detection time. However, the coordinate detection time has a short duration of 0.4 mS to 0.8 mS in the case of the display-integrated type tablet device to keep high the image display quality, and therefore the propagation delay of the scanning pulse due to the CR circuit cannot be ignored.

Assuming that the frequency of the clock signal cp1o input to the common electrode drive circuit 2 is 3 MHz and the period of from the time when a voltage is induced at the tip electrode of the detection pen 8 to the time when the induction voltage is detected by the y-coordinate detection circuit 11 can be ignored. When the delay of the scanning pulse due to the CR circuit is "0", assuming that the period of from the time when the scanning pulse starts to be applied to a common electrode Y1 to the time when a voltage is induced at the detection pen 8 is T, the y-coordinate at the tip end of the detection pen is expressed by Formula:

$$T \times (3 \times 10^6) \times L \tag{1}$$

where L is the distance between common electrodes.

The time in which the scanning pulse applied to the leftmost end of the common electrodes Y reaches the rightmost end depends on electrode material, liquid crystal material, the distance between the common electrodes and the segment electrodes which intersect each other, and the like, and takes several microseconds in the case of a normal duty type LCD panel. In the above case, the y-coordinate at the time when the detection pen 8 is located at the leftmost end of the common electrode Y can be expressed by Formula (1) without any problem. However, when the detection pen 8 is located at the rightmost end of the same common electrode Y, the time T in Formula (1) increases by several microseconds from the value when the detection pen is located at the leftmost end. As a result, the y-coordinate value increases despite that the detection pen 8 is located on the same common electrode Y.

What is further disadvantageous is the fact that the dielectric constant of the liquid crystals in the display section differs by about three times from that of the liquid crystals in the non-display section. Therefore, the electrostatic capacitances C of the pixels differ depending on whether they are in the display section or in the non-display section, which results in the variance of the delay time of the CR circuit depending on the content of image displayed even when the detection pen 8 is placed in the same position. In other words, even when the detection pen 8 is held in the same position, the y-coordinate detection value at the tip end of the detection pen varies when the content of image displayed changes.

When, for example, a straight line is drawn in parallel with the common electrode Y by means of the detection pen 8, the resulting straight line is distorted in the presence of such a propagation delay of the scanning pulse in the segment electrode X and the common electrode Y.

Although the displacement of the coordinate detection position due to the propagation delay of the CR circuit can be generally corrected by software means, it is difficult to correct the above-mentioned type of distortion of the coordinate detection position due to the change of the content of image displayed.

Meanwhile, the pulse position of the shift data (so) input to the segment electrode drive circuit 3 which has selected the coordinate detection mode is shifted in the shift register of the segment electrode drive circuit 3 in synchronization with the clock signal cp1o, and the scanning pulses of segment electrode scanning signals $x_1$ through $x_n$ (an arbitrary segment electrode scanning signal represented by x hereinafter) are successively applied from the output terminals O1 through Om corresponding to the shift position to the segment electrodes $X_1$ through $X_m$.

Although the above description is provided for the case where the segment electrodes X are scanned based on the shift data (so) and the clock signal cp1o, the segment electrodes X may be scanned in a manner as follows. In more detail, by using any bit of drive data $D_0d$ through $D_3d$ output from the detection control circuit 6 as the shift data sd and using the clock signal cp2d as a sync signal, the segment electrode scanning signal x is output sequentially from the output terminals O1 through Om of the segment electrode drive circuit 3 to the segment electrodes $X_1$ through $X_m$.

In the above case, the clock signal cp2d is a clock signal having a cycle in which the segment electrode X is scanned, and is input as the clock signal cp2o to the clock input terminal XCK of the segment electrode drive circuit 3 via the output terminal CP2O of the switching circuit 4.

It is noted that an output terminal EIO2 of the segment electrode drive circuit 3 is the output terminal in the final stage of the shift register, and a pulse signal sio2 having the same pulse width as that of the shift data sd is output from the output terminal EIO2 in a manner as shown in FIG. 13.

The segment electrode scanning signal x is also generated based on the bias power sources $V_0$ through $V_5$ supplied from the DC power supply circuit 12.

The coordinate detection period is separated into an x-coordinate detection period and a subsequent y-coordinate detection period. In the x-coordinate detection period, scanning pulses of the segment electrode scanning signal x are successively applied to the segment electrodes X, while in the y-coordinate detection period, scanning pulses of the common electrode scanning signal y are successively applied to the common electrodes Y.

In the above case, the voltage of the scanning pulses of the segment electrode scanning signal x or the common electrode scanning signal y for the electrodes to be scanned among the segment electrodes X and the common electrodes Y (the above-mentioned voltage referred to as the "scanning voltage" hereinafter) is set at the bias power voltage "$V_5$" supplied from the DC power supply circuit 12. On the other hand, the voltage of the segment electrode scanning signal x or the common electrode scanning signal y for the electrodes to be not scanned among the segment electrodes X and the common electrodes Y (the above-mentioned voltage referred to as the "non-scanning voltage" hereinafter) is set at the bias power voltage "$V_1$" supplied from the DC power supply circuit 12.

A voltage is induced at the detection pen 8 as shown in FIG. 18B due to stray capacitance between the segment electrode X or the common electrode Y and the detection pen 8 as shown in FIG. 18A attributed to the application of the scanning voltage $V_5$. The voltage induced at the detection pen 8 is amplified in the amplifier 9 and then converted into binary data in a manner as shown in FIG. 18C to be input to the x-coordinate detection circuit 10 and the y-coordinate detection circuit 11.

The x-coordinate detection circuit 10 and the y-coordinate detection circuit 11 detects the x-coordinate value or the y-coordinate value of the position pointed by the detection pen 8 by detecting a time "T" of from the time when the scanning voltage $V_5$ is applied to the time when the induction voltage takes its maximum value based on an output signal from the amplifier 9 and a timing signal from the control circuit 7.

FIG. 19 shows a timing chart of the segment electrode scanning signal x applied to the segment electrode X of the LCD panel 1 in the x-coordinate detection period.

FIG. 20 is a block diagram of an LCD panel 120, a common electrode drive circuit 121, and a segment electrode drive circuit 122 of the display-integrated type tablet device having the above-mentioned construction when the device is applied to a color display.

The above-mentioned display-integrated type tablet device basically has the same construction as that of the display-integrated type tablet device shown in FIG. 14 except that a filter having a specified light transmission characteristic is provided for each pixel of the LCD panel 120.

When the common electrode Y is placed in a position higher than that of the segment electrode X as viewed from the operator as shown in FIG. 20, an R-color filter is formed in an intersection region of the common electrode Y opposite to the segment electrode (e.g., $X_1, X_4, X_7, \ldots$) to which the drive pulses of the segment electrode drive signal is applied based on display data of R (Red) color (e.g., display data $D_0o$). A G-color filter is formed in the intersection region of the common electrode Y opposite to the segment electrode (e.g., $X_2$, $X_5$, $X_8$, . . . ) to which the drive pulses of the segment electrode drive signal is applied based on display data of G (Green) color (e.g., display data $D_1o$). In the same manner, a B-color filter is formed in the intersection region of the common electrode Y opposite to the segment electrode (e.g., $X_3$, $X_6$, $X_9$, . . . ) to which the drive pulses of the segment electrode drive signal is applied based on display data of B (Blue) color (e.g., display data $D_2o$).

The surface on which the color filters are formed is not limited to the above-mentioned surface, and when the segment electrode X is placed in an upper position, the color filters are formed on the segment electrode X. Otherwise, the color filters may be formed on a glass substrate on which the electrode placed in the lower position is formed.

When an image on the LCD panel 120 is viewed by reflection light of light entering from outside, there are formed color filters of C (Cyan), M (Magenta), and Y (Yellow) colors being the additive complementary colors respectively of the R, B, and G colors.

In the case of a simple type LCD panel which is not required to present full colors, two types of color filters are formed.

In the LCD panel 120 for color image display, the segment electrode X has a smaller electrode width and a smaller pitch as compared with that of the LCD panel 1 for monochrome image display shown in FIG. 8. In accordance with the above arrangement, there are greater number of segment electrodes X and greater number of output terminals O1 through Om of the segment electrode drive circuit 122.

For instance, in the display-integrated type tablet device for monochrome image display as shown in FIG. 14, the number m of the segment electrodes X is m=640, and the number n of the common electrodes Y is n=480. The pitch of the segment electrodes X is approximately equal to the pitch of the common electrodes Y. However, in the LCD panel 120 for color image display as shown in FIG. 20, the minimum unit of an image to be displayed (referred to as the "picture element" hereinafter) is composed of a combination of three pixels of R, G, and B arranged along the common electrode Y. Therefore, in order to display the same number of 480×640 picture elements as in the display-integrated type tablet device shown in FIG. 8, there are required 640×3=1920 segment electrodes X.

Furthermore, in the display-integrated type tablet device for color image display, the LCD panel 120 is designed to have approximately the same dimensional aspect ratio as that of the LCD panel 1 for monochrome image display so as to assure a compatibility with the display-integrated type tablet device for monochrome image display.

As a result, the width of the segment electrode X is smaller than that of the common electrode Y in the LCD panel 120 for color image display as shown in FIG. 20.

In the LCD panel 120 for color image display as shown in FIG. 20, the electrode density of the segment electrodes X is approximately three times as high as the electrode density of the common electrodes Y. Therefore, in constructing a display-integrated type tablet device using the LCD panel 120, the following problems exist.

[Fourth problem]

In a display-integrated type tablet device for monochrome image display as shown in FIG. 14, it is required to scan 640 electrodes in the x-coordinate detection period. Therefore, assuming that the frequency of the clock signal cp1d is 3 MHz, the scanning period of one segment electrode X is 0.333 μsec, and therefore the x-coordinate detection period is 0.333×640=213.12 μsec.

In contrast to the above, the x-coordinate detection period in the display-integrated type tablet device for color image display having the LCD panel 120 shown in FIG. 20 is 0.333×1920=639.36 μsec which is longer by approximately 430 μsec than that of the display-integrated type tablet device for monochrome image display.

As a result, when the number of frames per second of the display-integrated type tablet device for color image display is made equal to the number of frames per second of the display-integrated type tablet device for monochrome image display, the x-coordinate detection period is increased from the period shown in the chart of FIG. 15. The longer the coordinate detection period is, the shorter the image display period is in consequence. The above results in the problem that the duty ratio of image display is reduced to degrade the display image quality.

Furthermore, since the pitch of the segment electrodes X is smaller than the pitch of the common electrodes Y, the scanning speed in the x-direction (shift speed of the segment electrode scanning signal x) is slower than the scanning speed in the y-direction (shift speed of the common electrode scanning signal y) when the segment electrodes X and the common electrodes Y are scanned in synchronization with the clock signal cp1d. Consequently, the time in which the pulses applied to the segment electrode X for inducing a voltage at the detection electrode of the detection pen 8 is approaching the detection electrode is increased, and the time in which the pulse passes below the detection electrode is increased.

FIG. 21 shows waveforms (waveforms relative to a peak value of "1") of voltages induced at the detection electrode of the detection pen 8 in scanning the segment electrodes X and the common electrodes Y having different pitches. As is evident from the chart, the waveform of the voltage induced in the time of scanning the segment electrodes X having the smaller pitch exhibits a wholly gentle curve with a wide foot portion in contrast to the waveform of the voltage induced in scanning the common electrodes Y having the greater pitch.

The fact that the waveform of the voltage induced at the detection pen 8 is gentle means that the rise time "$T_1$" of the pulse tends to deviate while being influenced by noise contained in the foot portion of the voltage waveform in the time of converting the induction voltage into binary data by means of a comparator or the like in a manner as shown in FIG. 18C. Therefore, the time "T" to the peak of the voltage waveform calculated based on the rise time "$T_1$" tends to deviate, which results in lowering the x-coordinate detection accuracy at the tip end of the detection pen 8.

[Fifth problem]

In the display-integrated type tablet device for monochrome image display and the display-integrated type tablet device for color image display described as above, the coordinates at the tip end of the detection pen 8 are detected by utilizing the electrostatic capacitance between the segment electrode X or the common electrode Y and the detection electrode of the detection pen 8. In the above case, the voltage induced at the detection electrode is proportional to the electrostatic capacitance.

Therefore, when the electrode width is narrow as in the case of the segment electrode X of the display-integrated type tablet device for color image display, the voltage induced at the detection electrode of the detection pen 8 is low. As a result, the accuracy in detecting the x-coordinate at the tip end of the detection pen 8 is lowered.

SUMMARY OF THE INVENTION

Accordingly, it is a first object of the present invention to solve the aforementioned first problem and provide a display-integrated type tablet device which can be driven by a display control circuit for an LCD panel having no tablet function.

A second object of the present invention is to solve the aforementioned second problem and provide a display-integrated type tablet device which can execute coordinate detection at a high frequency without increasing the frame frequency.

A third object of the present invention is to solve the aforementioned third problem and provide a display-integrated type tablet device which can eliminate the possible distortion of the detection coordinates at the tip end of the detection pen by reducing the propagation delay time of the scanning pulse at the first electrode and the second electrode and eliminate particularly the possible distortion of the detection coordinates at the tip end of the detection pen even when the content of the image displayed changes.

A fourth object of the present invention is to solve the aforementioned fourth and fifth problems and provide a display-integrated type tablet device which can achieve a high coordinate detection accuracy without deteriorating the display image quality even when the electrode density of one electrode of a display panel is greater than the electrode density of the other electrode of the display panel.

In order to achieve the aforementioned first object, there is provided a display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit, a detection control circuit for sequentially scanning the first electrodes of the display panel by controlling the first drive circuit and sequentially scanning the second electrodes of the display panel by controlling the second drive circuit, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, the display-integrated type tablet device comprising: a clock generating section which generates a second clock signal having a frequency higher than a frequency of a first clock signal output from the display control circuit; a display data storage section into which display data of one display image frame is written in synchronization with an input sync signal and from which the-written display data of one display image frame is read in synchronization with an input sync signal; and a line switching section which switches a line of a sync signal input to the display data storage section in synchronization with a display image frame set up by the display control circuit to input the first clock signal as the sync signal to the display data storage section in writing the display data into the display data storage section and input the second clock signal as the sync signal to the display data storage section in reading the display data from the display data storage section, wherein a time required for reading the display data of one display image frame from the display data storage section is made shorter than a time required for writing the display data of one display image frame into the display data storage section to provide a display data reading time and an idle time in one display image frame to thereby operate the detection control circuit in the idle time.

According to the display-integrated type tablet device, the sync signal line is switched by the line switching section in synchronization with a display image frame set up in the display control circuit, and the first clock signal output from the display control circuit is input as a sync signal to the display data storage section. Then display data of one display image frame is written into the display data storage section in synchronization with the input sync signal (first clock signal).

Then the sync signal line is switched by the line switching section in synchronization with the next display image frame set up in the display control circuit, and the second clock signal having a frequency higher than that of the first clock signal and generated in the clock generating section is input as a sync signal to the display data storage section. Then the display data of one display image frame is read from the display data storage section in synchronization with the input sync signal (second clock signal).

Then an image in one display image frame is displayed on the display panel by the first drive circuit and the second drive circuit based on the read display data of the one display image frame.

Since the time required for reading the display data of one display image frame from the display data storage section is shorter than the time required for writing the display data in a manner as described above, a display data read time and an idle time are provided in one display image frame.

Therefore, by operating the detection control circuit in the idle time, the coordinates pointed by the tip end of the detection pen on the display panel are detected in a manner as follows.

Based on the control of the detection control circuit, the first electrodes are sequentially scanned by the first drive circuit. In the above time, based on the timing of the generation of the induction voltage signal induced at the electrode at the tip end of the detection pen electrostatically coupled with the first electrodes and the timing of the scanning of the first electrodes, the x-coordinate value at the position pointed by the tip end of the detection pen is detected by the x-coordinate detection circuit.

In the same manner as above, the second electrodes are successively scanned by the second drive circuit. Then based on the timing of the generation of the induction voltage signal from the detection pen and the timing of the scanning of the second electrode, the y-coordinate value at the position pointed by the tip end of the detection pen is detected by the y-coordinate detection circuit.

Thus by providing the idle time in one display image frame period set up by the display control circuit in executing an image display operation, the coordinates at the position pointed by the tip end of the detection pen are detected based on the control of the detection control circuit even when a display control circuit for an LCD panel having no tablet function is employed.

Also, there is provided a display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially scanning the first electrodes of the display panel by controlling the first drive circuit and sequentially scanning the second electrodes of the display panel by controlling the second drive circuit in a coordinate detection period, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, wherein the display panel is separated in a plurality of blocks, the first drive circuit and the second drive circuit are each comprised of independent sections separated so that the first electrodes and the second electrodes belonging to each of the blocks can be independently driven, the display control circuit can control the first drive circuit and the second drive circuit so as to display an image in blocks of the display panel, and the detection control circuit can control the first drive circuit and the second drive circuit so as to set up the coordinate detection period within a time when a display signal is transmitted in each of the blocks of the display panel to execute detection of the coordinates at the tip end of the detection pen plural times in one display image frame period.

According to the display-integrated type tablet device, the sections of the first drive circuit or the sections of the second drive circuit separated so that the first electrodes or the second electrodes belonging to each block of the display panel can be independently driven is independently controlled by the display control circuit.

Thus images are displayed in all the plural number of blocks constituting the display panel to display the entire image in one display image frame.

In the above place, a coordinate detection period is set up between the image display periods of blocks of the display panel by the detection control circuit to detect the coordinates at the position pointed by the top end of the detection pen on the display panel between times of displaying images in blocks.

Therefore, the coordinate detection is executed plural times in one display image frame period to make the coordinate detection frequency higher than the frame frequency.

In the display-integrated type tablet device, each of the first drive circuit and the second drive circuit has a shift register, a shift data input terminal, and a shift data output terminal in each of the separated sections, a shift data supply line switching circuit which switches between shift data supply lines so that shift data from the display control circuit is input to the shift data input terminal of each of the separated sections of the first drive circuit or the shift data input terminal of each of the separated sections of the second drive circuit for driving electrodes belonging to a block in which an image is to be displayed on the display panel in the image display period, the shift data is input to the shift data input terminal of each of the separated sections of the first drive circuit and the shift data input terminal of each of the separated sections of the second drive circuit for driving electrodes belonging to a block at an end of the display panel in the coordinate detection period, and the shift data from the shift data output terminals of the separated sections is input to the shift data input terminal of another adjoining separated sections is provided to display an image in units of blocks of the display panel in the image display period and continuously scan the first electrodes and the second electrodes of the display panel sequentially from an electrode located at an end to an electrode located at the other end in the coordinate detection period.

According to the above arrangement, the shift data supply line is switched by the shift data supply line switching circuit in the image display period to input shift data from the display control circuit to the shift data input terminal of each of the separated sections of the first drive circuit or the shift data input terminal of each of the separated sections of the second drive circuit for driving the electrodes belonging to the block in which an image is to be displayed on the display panel. Then an image is displayed in the block in which the image is to be displayed on the display panel.

After the image is thus displayed in the block in which the image is to be displayed on the display panel, the device operation enters into the coordinate detection period, and the shift data supply line is switched by the shift data supply line switching circuit to input the shift data to the shift data input terminal of each of the separated sections of the first drive circuit or the shift data input terminal of each of the separated sections of the second drive circuit for driving the electrodes belonging to the block at an end of the display panel. To the shift data input terminals of the other separated sections are input shift data from the shift data output terminals of the adjacent separated sections.

Then the first electrodes and the second electrodes of the display panel are continuously scanned sequentially from the electrode located at an end to the electrode located at the other end.

Thus the coordinate detection is executed plural times in one display image frame period by displaying an image by separating in one display image frame in plural number of blocks and executing coordinate detection in the image display period in each block to make the coordinate detection frequency higher than the frame frequency.

Also, a display screen is composed of a plurality of display panels separated in blocks, the first drive circuit and the second drive circuit are provided for each block of each of the display panels, the display control circuit controls the first drive circuit and the second drive circuit so as to display an image in units of blocks constituting each of the display panels, and the detection control circuit controls the first drive circuit and the second drive circuit so as to continuously scan the first electrodes and the second electrodes of the display screen composed of the plural number of display panels sequentially from an electrode located at an end of the display screen to an electrode located at the other end of the display screen.

According to the above arrangement, the first drive circuit and the second drive circuit provided for each display panel constituting the display screen are controlled by the display control circuit in the image display period to display an image in units of blocks constituting each display panel.

Meanwhile, in the coordinate detection period set up between the image display periods of blocks, the first drive circuit and the second drive circuit are controlled by the detection control circuit to continuously scan the first electrodes and the second electrodes of the display screen composed of the plural number of display panels sequentially from the electrode located at an end of the display screen to the electrode located at the other end of the display screen.

Thus the coordinate detection is executed plural times in one display image frame period to make the coordinate detection frequency higher than the frame frequency.

There is provided a display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially scanning the first electrodes of the display panel by controlling the first drive circuit and sequentially scanning the second electrodes of the display panel by controlling the second drive circuit in a coordinate detection period, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, wherein each of the first drive circuit and the second drive circuit has an electric resistance of not greater than 15 Ω/□.

According to the above device, the first electrodes and the second electrodes constituting the display panel are each made to have an electric sheet resistance of not greater than 15 Ω/□. Therefore, the propagation delay time of the scanning pulse applied to the first electrode or the second electrode is short, and the quantity of distortion of the detection coordinates at the tip end of the detection pen is little.

Further, there is provided a display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially scanning the first electrodes of the display panel by controlling the first drive circuit and sequentially scanning the second electrodes of the display panel by controlling the second drive circuit in a coordinate detection period, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, wherein the detection control circuit controls the first drive circuit and the second drive circuit so that a scanning speed of a longer one of the first electrode and the second electrode is slower than a scanning speed of the shorter one of the electrodes and the a scanning frequency of the first electrode and a scanning frequency of the second electrode are in a ratio of an integer.

According to the display-integrated type tablet device, the first drive circuit and the second drive circuit are controlled by the detection control circuit in the coordinate detection period to scan the longer one of the first electrode and the second electrode at a scanning speed slower than the scanning speed of the shorter one of the electrodes.

With the above-mentioned arrangement, the propagation delay time of the scanning pulse applied to the longer one of the electrodes is made relatively short to reduce the distortion of the detection coordinates at the tip end of the detection pen. In other words, because the ratio of the propagation delay time to a scanning pulse period is short, the distortion of the detection coordinates is reduced.

In the above place, the detection control circuit controls the first drive circuit and the second drive circuit so that the scanning frequency of the first electrodes and the scanning frequency of the second electrodes is in a ratio of an integer, and therefore the coordinates at the tip end of the detection pen is easily calculated based on the voltage induced at the detection pen.

There is provided a display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially scanning the first electrodes of the display panel by controlling the first drive circuit and sequentially scanning the second electrodes of the display panel by controlling the second drive circuit in a coordinate detection period, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, wherein a display screen is composed of a plurality of the display panels, the first drive circuit and the second drive circuit are provided for each of the display panels, the display control circuit controls the first drive circuits and the second drive circuits so as to display an image on the display screen composed of the plural number of display panels, and the detection control circuit controls the first drive circuits and the second drive circuits so as to continuously scan the first electrodes and the second electrodes of all of the display panels sequentially from an electrode located at an end of the display screen to an electrode located at the other end of the display screen.

According to the arrangement, since the display screen is composed of plural number of display panels, each electrode constituting each display panel is short and has a low electric resistance. Therefore, the propagation delay time of the scanning pulse applied to each electrode is short, and the quantity of distortion of the detection coordinates at the tip end of the detection pen is little.

There is provided a display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially scanning the first electrodes of the display panel by controlling the first drive circuit and sequentially scanning the second electrodes of the display panel by controlling the second drive circuit in a coordinate detection period, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, wherein the first drive circuit is composed of two first drive circuits of a first first drive circuit and a second first drive circuit where the first first drive circuit and the second first drive circuit are arranged opposite to each other with interposition of the display panel, the second drive circuit is composed of two second drive circuits of a first second drive circuit and a second second drive circuit where the first second drive circuit and the second second drive circuit are arranged opposite to each other with interposition of the display panel, the first electrodes driven by the first first drive circuit and the first electrodes driven by the second first drive circuit are arranged alternately with each other while the second electrodes driven by the first second drive circuit and the second electrodes driven by the second second drive circuit are arranged alternately with each other, the display control circuit controls the drive circuits so as to display an image on the display panel having the first electrodes and the second electrodes driven by the first first drive circuit, the second first drive circuit, the first second drive circuit, and the second second drive circuit, and the detection control circuit controls the first first drive circuit, the second first drive circuit, the first second drive circuit, and the second second drive circuit so as to continuously scan the electrodes sequentially from an electrode located at an end of the display panel to an electrode located at the other end of the display panel.

According to the above arrangement, the pair of the first first drive circuit and the second first drive circuit, or the pair of the first second drive circuit and the second second drive circuit for driving adjoining electrodes of the display panel are arranged opposite to each other with interposition of the display panel. Therefore, the degree of delay in the lengthwise direction of all the electrodes is averaged to reduce the quantity of distortion of the detection coordinates at the tip end of the detection pen.

There is provided a display-integrated type tablet device including a matrix-shaped display panel having first electrodes arranged in a specified electrode density and second electrodes which are intersecting the first electrodes at right angles and which are arranged in a different electrode density and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially applying a scanning voltage to the first electrodes of the display panel by controlling the first drive circuit and sequentially applying a scanning voltage to the second electrodes of the display panel by controlling the second drive circuit in a coordinate detection period, and a coordinate detection circuit for detecting coordinates at a position pointed by the tip end of the detection pen on the display panel according to timings of generating output signals from the detection pen and timings of scanning the first electrodes and the second electrodes, wherein the detection control circuit controls the first drive circuit and the second drive circuit so that the number of scanning lines per unit time relevant to electrodes having a higher electrode density among the first electrodes and the second electrodes is greater than the number of scanning lines per unit time relevant to electrodes having a lower electrode density.

According to the above arrangement, the first electrode and the second electrode are alternately controlled in the coordinate detection period to alternately scan the first electrodes and the second electrodes constituting the LCD panel.

In the above place, the electrodes are scanned so that the number of scanning lines per unit time relevant to the electrodes having the higher electrode density among the first electrodes and the second electrodes is greater than the number of scanning lines per unit time relevant to the electrodes having the lower electrode density, and therefore the scanning speed in the x-direction is made approximately equal to the scanning speed in the y-direction.

By virtue of the above-mentioned arrangement, the waveform of the voltage induced at the detection electrode of the detection pen in the x-coordinate detection period and the waveform of the voltage induced at the detection electrode of the detection pen in the y-coordinate detection period are made approximately same, and therefore the x-coordinate detection and the y-coordinate detection are executed at approximately same detection accuracy.

There is provided a display-integrated type tablet device including a matrix-shaped display panel having first electrodes arranged in a specified electrode density and second electrodes which are intersecting the first electrodes at right angles and which are arranged in a different electrode density and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially applying a scanning voltage to the first electrodes of the display panel by controlling the first drive circuit and sequentially applying a scanning voltage to the second electrodes of the display panel by controlling the second drive circuit in a coordinate detection period, and a coordinate detection circuit for detecting coordinates at a position pointed by the tip end of the detection pen on the display panel according to timings of generating output signals from the detection pen and timings of scanning the first electrodes and the second electrodes, wherein the detection control circuit controls the first drive circuit and the second drive circuit so that at least ones of a plural number of the first electrodes and a plural number of the second electrodes are simultaneously scanned and the number of scanning lines scanned simultaneously relevant to the electrodes having a higher electrode density among the first electrodes and the second electrodes is greater than the number of scanning lines scanned simultaneously relevant to the electrodes having a lower electrode density.

According to the above arrangement, the first electrode and the second electrode are alternately controlled by the detection control circuit in the coordinate detection period to approximately simultaneously scan plural number of first electrodes or plural number of second electrodes constituting the LCD panel.

In the above place, the electrodes are scanned so that the electrodes having the higher electrode density among the first electrodes and the second electrodes are scanned more in number than the electrodes having the lower electrode density, and therefore the width of the electrodes in the active state is made approximately same in both the electrodes.

By virtue of the above-mentioned arrangement, the value of the voltage induced at the detection electrode of the detection pen in the x-coordinate detection period and the value of the voltage induced at the detection electrode of the detection pen in the y-coordinate detection period are made approximately same, and therefore the x-coordinate detection and the y-coordinate detection are executed at approximately same detection accuracy.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a timing chart of a segment electrode scanning signal and a common electrode scanning signal applied to a segment electrode and a common electrode of an LCD panel for use in a display-integrated type tablet device in accordance with another embodiment of the present invention;

FIG. 11 is a timing chart different from the one shown in FIG. 8;

FIG. 19 is a timing chart of a segment electrode scanning signal applied to the segment electrodes in the x-coordinate detection period in the display-integrated type tablet device shown in FIG. 14;

DETAILED DESCRIPTION OF THE PREFERRED EMBODIMENTS

The following describes several embodiments of the present invention with reference to the attached drawings.
First Embodiment A display-integrated type tablet device in accordance with a first embodiment of the present invention is to display an image on an LCD panel and detect coordinates at a tip end of a detection pen by making the LCD panel operate as a tablet by means of a display control circuit for a normal LCD panel having no tablet function.

Figure 1:
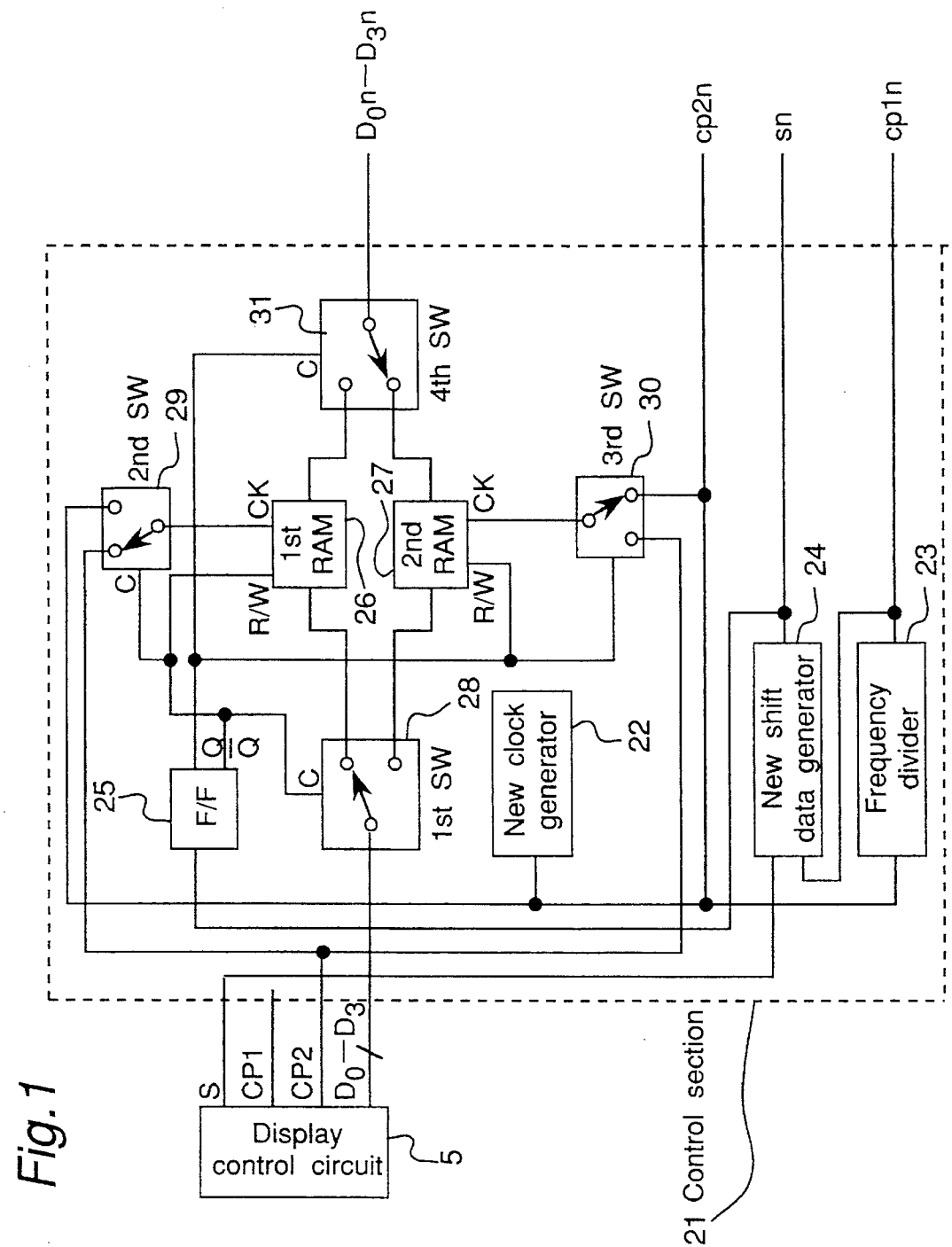
FIG. 1 is a block diagram of an LCD panel drive section of a display-integrated type tablet device in accordance with an embodiment of the present invention.

FIG. 1 shows a block diagram of an LCD panel drive section of a display-integrated type tablet device in accordance with the first embodiment of the present invention. It is noted that, in FIG. 1, the LCD panel, common electrode drive circuit, segment electrode drive circuit, detection control circuit, switching circuit, control circuit, detection pen, amplifier, x-coordinate detection circuit, and y-coordinate detection circuit are not shown, because the are the same as shown in FIG. 14.

Figure 14:
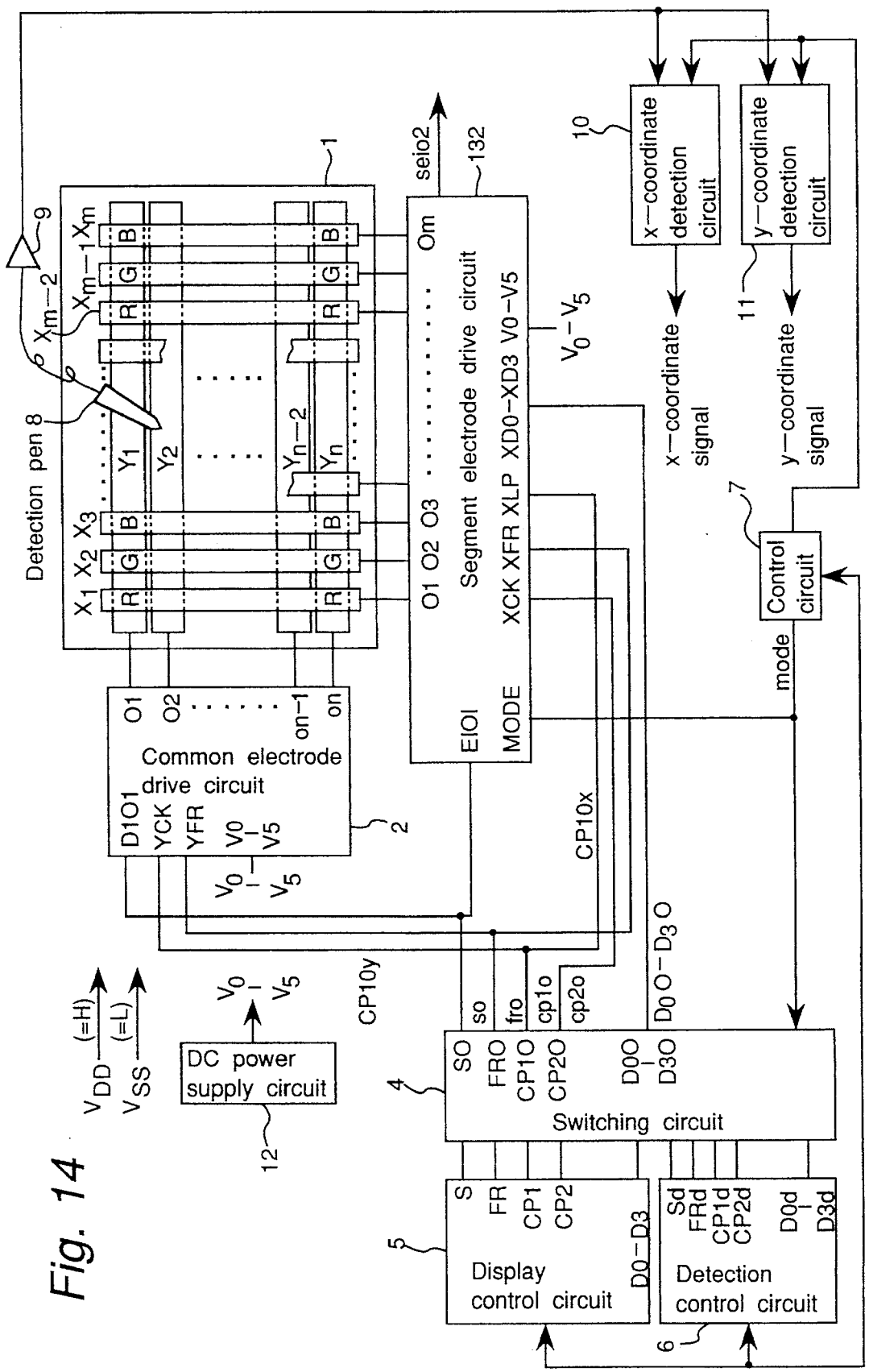
FIG. 14 is a block diagram of a display-integrated type tablet device.
Figure 15:
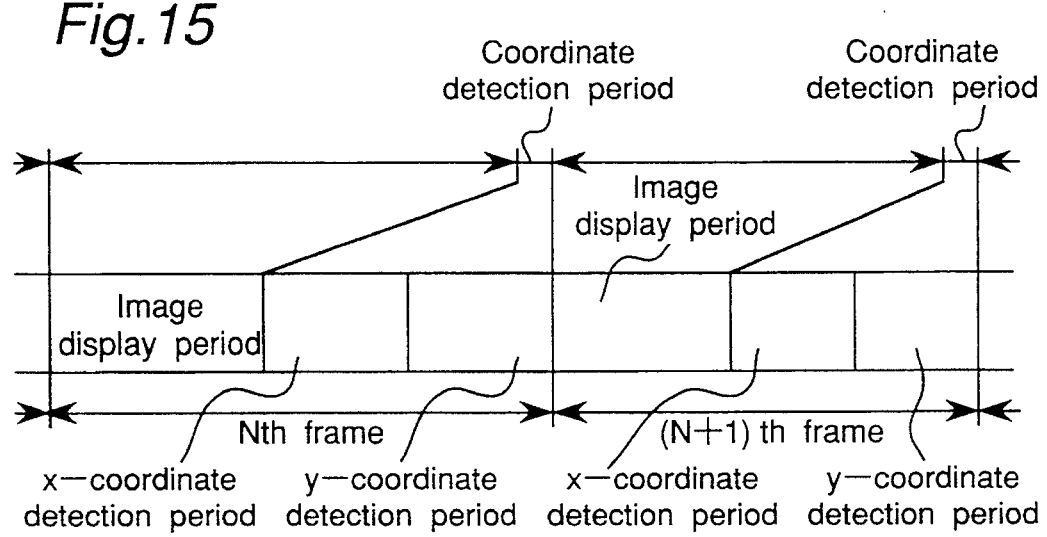
FIG. 15 is a diagram of exemplified image display period and coordinate detection period of the display-integrated type tablet device shown in FIG. 14.
Figure 16:
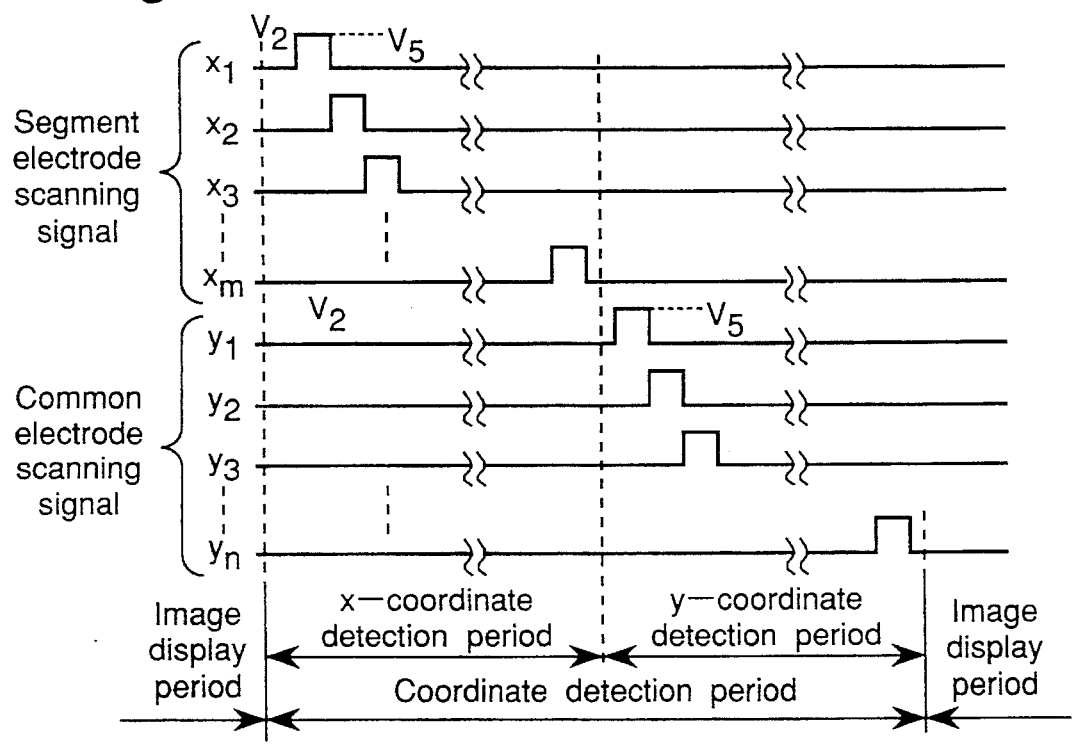
FIG. 16 is a timing chart of a segment electrode scanning signal and a common electrode scanning signal in the display-integrated type tablet device shown in FIG. 14.
Figure 17:
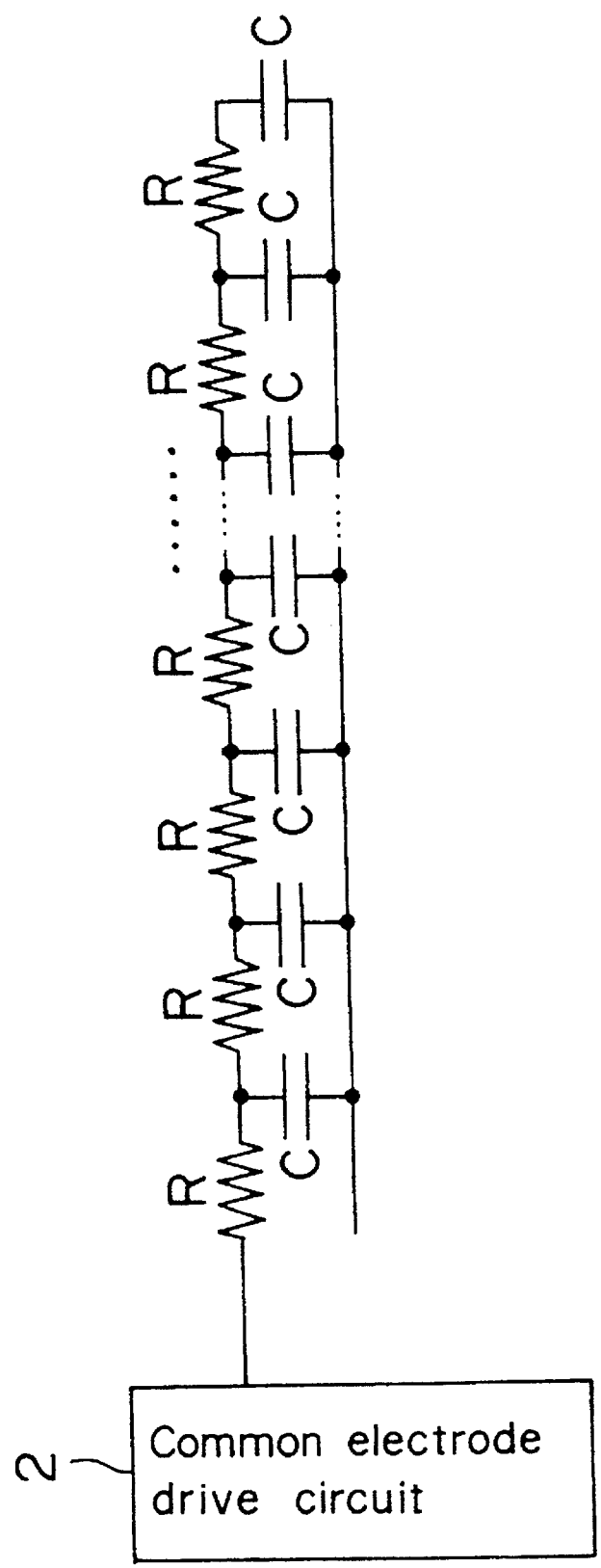
FIG. 17 is a CR circuit equivalent to the common electrodes.
Figure 18A:
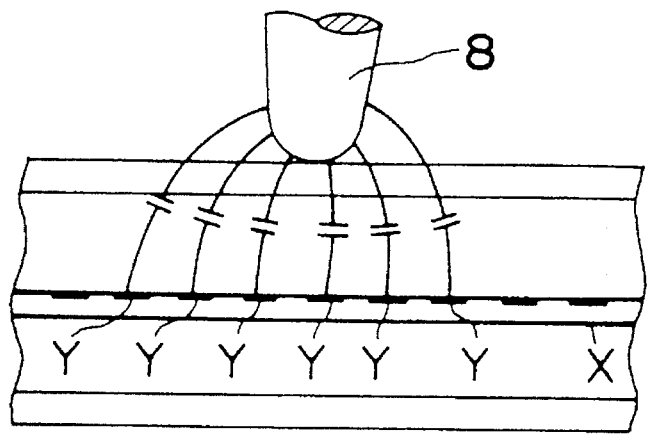
FIGS. 18A, 18B, and 18C are explanatory views of a stray capacitance between a segment electrode X or a common electrode Y and a detection pen, a signal detected by the detection pen, and a binary signal thereof in the display-integrated type tablet device shown in FIG. 14.
Figure 18B:
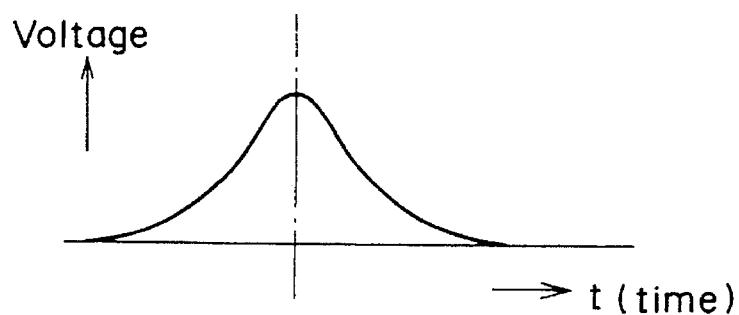
Figure 18C:
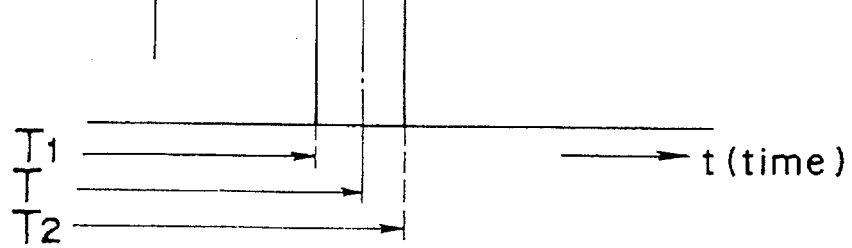

A display control circuit 5 operates in the same manner as the display control circuit 5 of the display-integrated type tablet device shown in FIG. 14 and serves as a display control circuit for the normal LCD panel having no tablet function.

From a shift data output terminal S of the display control circuit 5 is output a shift data s which is a pulse signal for selecting a common electrode Y to be driven. From a clock output terminal CP1 is output a clock signal cp1 which has a cycle in which pixels in one line display an image. From a clock output terminal CP2 is output a clock signal cp2 having a cycle which is one severalth of the cycle in which pixels in one line display an image.

There are further output display data $D_0$ through $D_3$ from data output terminals D0 through D3.

The display data $D_0$ through $D_3$ are sequentially taken into a register in the segment electrode drive circuit in synchronization with the clock signal cp2. When all the data corresponding to the pixels in one line are taken in, the data are latched at the timing of the clock signal cp1, and a drive pulse of the segment electrode drive signal is applied to each segment electrode. At the same time, a drive pulse of the common electrode drive signal is applied to one common electrode corresponding to the above-mentioned one line.

Thus an image is displayed at a pixel located at a position where the common electrode to which the drive pulse of the common electrode drive signal is applied and the segment electrode to which the drive pulse of the segment electrode drive signal intersect each other.

The outputs of the shift data s, clock signal cp1, clock signal cp2, and the display data $D_0$ through $D_3$ from the display control circuit 5 are arranged in time as shown in FIG. 2(b). In other words, no coordinate detection period exists in each image display period in the present embodiment.

The present embodiment is provided with a control section 21 to allow detection of the coordinates at the tip end of the detection pen by means of the display control circuit 5 in which no coordinate detection period is set up.

The control section 21 is principally composed of a new clock generator 22, a frequency divider 23, a new shift data generator 24, a flip-flop (abbreviated to "F/F" hereinafter) 25, a first RAM (Random Access Memory) 26, a second RAM 27, a first switch (abbreviated to SW hereinafter) 28, a second SW 29, a third SW 30, and a fourth SW 31.

The new clock generator 22 is a circuit for generating a new clock signal $cp2_n$. The new clock signal $cp2_n$ is a clock signal which has a frequency higher by several percent than that of the clock signal cp2 output from the display control circuit 5. The frequency divider 23 generates a new clock signal $cp1_n$ by dividing the new clock signal $cp2_n$. When, for instance, the number of segment electrodes is 640 and the display data $D_0$ through $D_3$ are taken in 4 bits by 4 bits in the present case, the frequency division by the frequency divider 23 is 4/640= 1/160.

With the above-mentioned arrangement, when, for instance, the new clock signal $cp2_n$ rises (or falls) 160 times to take in display data of 640 bits (i.e., in one line), the new clock signal $cp1_n$ rises (or falls) to latch display data of one line to be output to 640 segment electrodes.

The new shift data generator 24 generates a new shift data $s_n$ from the shift data s from the display control circuit 5 and the new clock signal $cp1_n$ from the frequency divider 23. The new shift data $s_n$ has the same cycle as that of the shift data s and is corrected to have a pulse width synchronized with the pulse width of the new clock signal $cp1_n$ according to the arrangement that the pulse width of the new clock signal $cp1_n$ is made narrower than that of the clock signal cp1.

With the first RAM 26 and the second RAM 27, a read/write operation of the display data $D_0$ through $D_3$ is executed in synchronization with the clock signal input to a clock input terminal CK based on a control signal from the F/F 25 input to an input terminal R/W.

The first SW 28 and the fourth SW 31 switch over between the first RAM 26 and the second RAM 27 with the write operation and the read operation of the display data $D_0$ through $D_3$ based on the control signal from the F/F 25. Meanwhile, the second SW 29 and the third SW 30 switch the clock signal input to the clock input terminals CK of the first RAM 26 and the second RAM 27 based on the control signal from the F/F 25.

The control section 21 having the above-mentioned construction operates in a manner as follows.

In a condition as shown in FIG. 1, the third SW 30 is switched to the side of the new clock signal $cp2_n$, and the fourth SW 31 is switched to the side of the second RAM 27 based on the control signal of level "H" from an output terminal Q of the F/F 25. Meanwhile, the first SW 28 is switched to the side of the first RAM 26, and the second SW 29 is switched to the side of the clock signal cp2 based on the control signal of level "L" from an output terminal $\overline{Q}$ of the F/F 25.

The control signal of level "H" from the output terminal Q of the F/F 25 is input to the input terminal R/W of the second RAM 27 which is set at the side of read. Meanwhile, the control signal of level "L" from the output terminal $\overline{Q}$ of the F/F 25 is input to the input terminal R/W of the first RAM 26 which is set at the side of write.

Consequently, the display data $D_0$ through $D_3$ from the display control circuit 5 are sequentially written into the first RAM 26 in synchronization with the clock signal cp2 input to the clock input terminal CK. Meanwhile, stored display data $D_0$ through $D_3$ are sequentially read from the second RAM 27 in synchronization with the new clock signal $cp2_n$ input to the clock input terminal CK to be then output as new display data $D_{0_n}$ through $D_{3_n}$.

Subsequently when a pulse of the new shift data $s_n$ is input from the new shift data generator 24 to the F/F 25, the level of the control signal output from the output terminal $\overline{Q}$ and the level of the control signal output from the output terminal $\overline{Q}$ are inverted. Then the first SW 28 is switched to the side of the second RAM 27, the second SW 29 is switched to the side of the new clock signal $cp2_n$, the third SW 30 is switched to the side of the clock signal cp2, and the fourth SW 31 is switched to the side of the first RAM 26.

Consequently, contrary to the above case, the stored display data $D_0$ through $D_3$ are sequentially read from the first RAM 26 in synchronization with the input new clock signal $cp2_n$ to be output as the new display data $D_{0_n}$ through $D_{3_n}$. Meanwhile, display data $D_0$ through $D_3$ from the display control circuit 5 are sequentially written into the second RAM 27 in synchronization with the clock signal cp2.

In the above place, the cycle of the new shift data $s_n$ is equal to the cycle of the shift data s from the display control circuit 5 as described above. Therefore, the pulse of the new shift data $s_n$ rises (or falls) at the time when each display image frame changes. In other words, the first RAM 26 and the second RAM 27 repeat alternately the write operation and the read operation of the display data $D_0$ through $D_3$ of one frame in each frame.

The new clock signal $cp2_n$ is a clock signal having a frequency higher by several percent than the frequency of the clock signal cp2 as described above. Therefore, the display data $D_0$ through $D_3$ of one frame are sequentially read in synchronization with the new clock signal $cp2_n$ having a frequency higher by several percent than the frequency of the clock signal cp2 from the first RAM 26 or the second RAM 27 into which the display data $D_0$ through $D_3$ of one frame are written in synchronization with the clock signal cp2, with which the read time is made shorter than the write time and an idle time Td is generated after the read time as shown in FIGS. 2 (c) and 2 (d).

Figure 2:
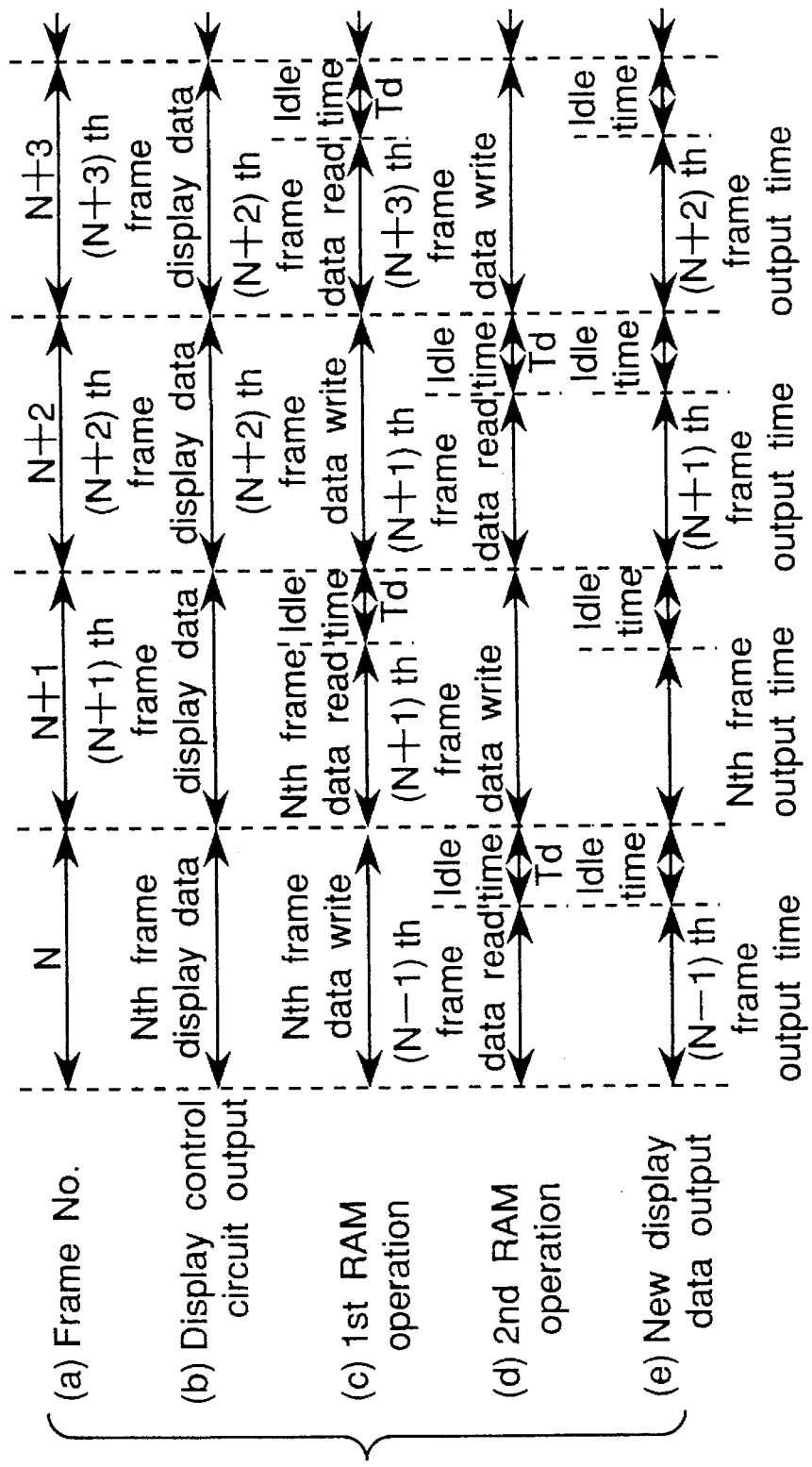
FIG. 2 is an exemplified timing chart of the operation of the LCD panel drive section shown in FIG. 1.

Consequently, the output timing of the new display data $D_{0n}$ through $D_{3n}$ by the fourth SW 31 is as shown in FIG. 2 (e) where the display data output time and the idle time are included in the period of each frame. Then by using the idle time thus provided in the period of each frame as a coordinate detection period, the display-integrated type tablet can be driven by the display control circuit 5 for an LCD panel having no tablet function.

It is noted that, because the display data $D_0$ through $D_3$ output from the display control circuit 5 are once stored in the first RAM 26 or the second RAM 27 and then output as the new display data $D_{0n}$ through $D_{3n}$, there is a displacement of one frame between the frame number of the new display data $D_{0n}$ through $D_{3n}$ output from the control section 21 and the frame number of the display data $D_0$ through $D_3$ output from the display control circuit 5 in an identical frame period.

In order to operate the LCD panel as a tablet in a manner as described above, for example, the following procedure is required.

In detail, the x-coordinate detection circuit and y-coordinate detection circuit connected to the detection pen, detection control circuit, switching circuit, control circuit, and the like shown in FIG. 14 are packed in a package, and then the new shift data $s_n$, new clock signal $cp1_n$, new clock signal $cp2_n$, and new display data $D_{0n}$ through $D_{3n}$ output from the control section 21 shown in FIG. 1 are input to the switching circuit.

In the output period in each frame, the switching circuit is switched to the side of the control section 21, and the segment electrode drive circuit and the common electrode drive circuit are driven by the new shift data $s_n$, new clock signal $cp1_n$, new clock signal $cp2_n$, and the like from the control section 21 to display an image on the LCD panel based on the new display data $D_{0n}$ through $D_{3n}$. Meanwhile, in the idle time in each frame, the switching circuit is switched to the side of the detection control circuit, and the segment electrode drive circuit and the common electrode drive circuit are driven by the shift data, clock signal, and the like from the detection control circuit to scan the segment electrodes and the common electrodes of the LCD panel and detect the coordinates at the tip end of the detection pen by means of the x-coordinate detection circuit and the y-coordinate detection circuit.

In the present embodiment as described above, the display control circuit 5 for the normal LCD panel having no tablet function is connected with the control section 21 having the new clock generator 22, frequency divider 23, new shift data generator 24, first RAM 26, second RAM 27, SWs 28, 29, 30, and 31, and F/F 25.

Then by means of the control section 21, the new clock signal $cp2_n$ having a frequency higher by several percent than that of the clock signal cp2 from the display control circuit 5, the new clock signal $cp1_n$ obtained by dividing the new clock signal $cp2_n$, and the new shift data $s_n$ having the same cycle as that of the shift data s from the display control circuit 5 and the same pulse width as that of the new clock signal $cp1_n$ are generated and output.

Further by controlling switching of the SWs 28, 29, 30, and 31 by means of the F/F 25 driven by the new shift data $s_n$, the display data $D_O$ through $D_3$ of one frame are written into either the first RAM 26 or the second RAM 27 in synchronization with the clock signal cp2 from the display control circuit 5, and at the same time, display data $D_0$ through $D_3$ of one frame are read from the other one in synchronization with the new clock signal $cp2_n$ to be output as the new display data $D_{0n}$ through $D_{3n}$.

Thus by making the read operation faster by several percent than the write operation with the first and second RAMs 26 and 27, the idle time is set up in one frame.

As a result, the idle time set up in one frame can be used as a coordinate detection time, which allows the display control circuit 5 for the LCD panel having no tablet function to be used without modification to make the LCD panel operate as a tablet.

In the above-mentioned embodiment, by using the two RAMs of the first RAM 26 and the second RAM 27, there are achieved the write operation of the display data $D_0$ through $D_3$ synchronized with the clock signal cp2 and the read operation of the display data synchronized with the new clock signal $cp2_n$ in an identical frame period. However, the present invention is not limited to the above-mentioned arrangement, and the construction and operation of devices can be simplified with a dual-port RAM which can independently execute input and output operations in synchronization with different clock signals.

Then reference is made to an embodiment which employs a FIFO (First In First Out) type memory (abbreviated to FIFO hereinafter). In contrast to the case where a RAM is used as a memory as shown in FIG. 1, the present embodiment can remarkably reduce the capacity of the memory and allows the peripheral circuits to be simplified.

Figure 22:
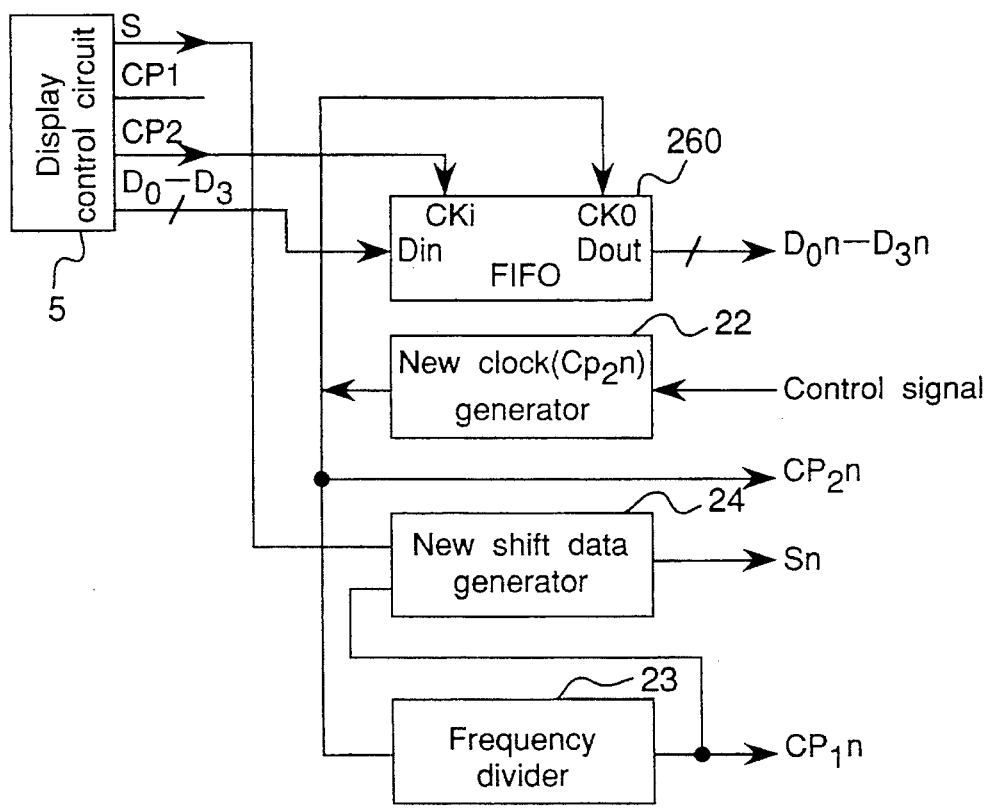
FIG. 22 is a block diagram of an essential portion of an embodiment employing a FIFO type memory.

FIG. 22 is a block diagram of a construction employing the FIFO.

Although no detailed description is made for the FIFO, the following provides a simple explanation of the basic operation of FIFO. A FIFO 260 sequentially reads data at terminal Din according to a clock CKi and sequentially outputs the data from terminal Dout in the same order as the data input according to a clock CKout in a manner as shown in FIG. 22. In other words, it operates approximately as a shift register operating on different input and output clock pulses.

Display data $D_0$ through $D_3$ output according to a clock CP2 from the display control circuit 5 are transmitted to the FIFO memory 260 and stored according to the clock CP2. The stored display data are read according to a clock CP2n. The frequency of the clock CP2n is set at a frequency higher than that of the clock CP2.

Figure 23:
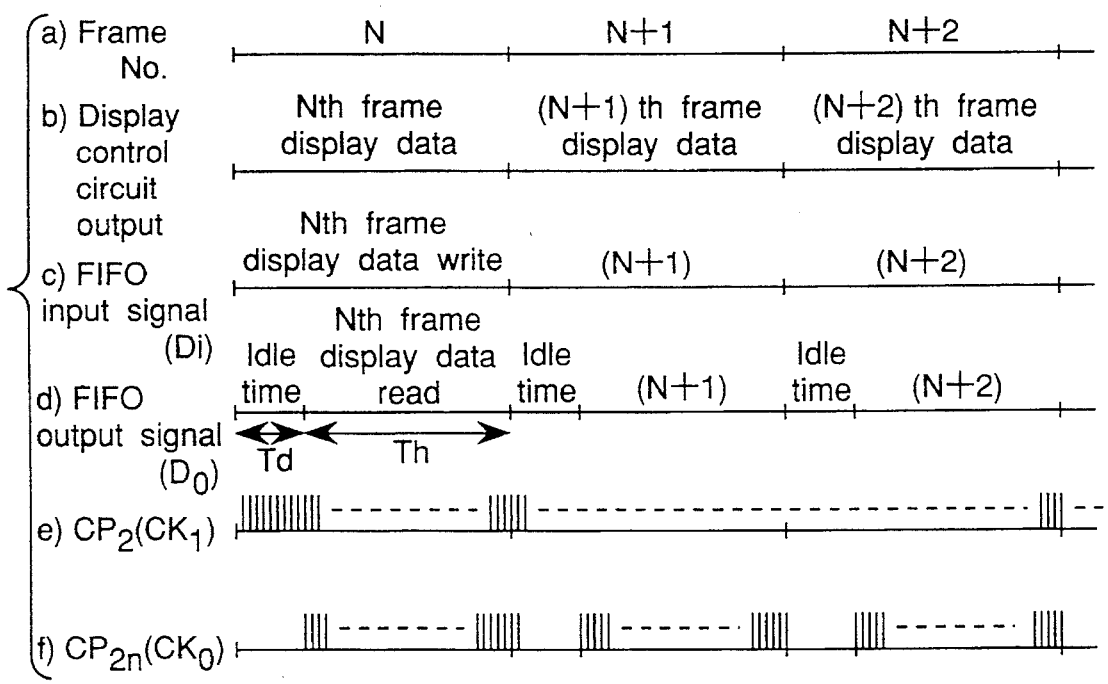
FIG. 23 is a timing chart of signals in various sections of the embodiment shown in FIG. 22.

FIG. 23 shows the timing in the above case. The FIFO 260 is made to store no data in the initial stage. The display data output from the display control circuit 5 are first continuously transmitted sequentially from the top display data to the FIFO 260 according to the clock CP2 with almost no idle time in between frames in a manner as shown in FIG. 23 (b).

Data reading from the FIFO 260 is executed after setting the idle time Td. In more detail, the .clock CP2n is not output in the idle time Td based on a control signal from a control circuit (not shown), while the clock CP2n is applied in a time Th to read the display data sequentially from the top display data in a manner as shown in FIG. 23 (*f*). In other words, the display data are taken in according to the clock CP2 and read out according to the clock CP2n in the time Th. In the above case, the clock CP2n is set up as follows.

$$CP2n = To \cdot CP2 / Th \tag{1}$$

With the above setting, the display data of one frame output in one frame time To from the display control circuit 5 is output from the FIFO 260 in the time Th after the elapse of the idle time Td.

Therefore, in the same manner as in the embodiment shown in FIG. 1, a display signal including therein the coordinate detection time Td as shown in FIG. 23 (*d*) can be generated from the display data having no coordinate detection period shown in FIG. 23 (*b*). In the above case, the FIFO 260 is allowed to have the same capacity as that of the data transmitted from the display control circuit 5 in the idle time Td. When the ratio of the coordinate detection time (Td) to one frame time (To) is 5%, the data storage capacity of the FIFO 260 is allowed to be 5% of the display data necessary for image display in one frame.

In the case where the display panel has 640×480=307,200 pixels, there are required 307,200 bits for each of the first RAM and the second RAM by the means shown in FIG. 1. In contrast to the above, the means shown in FIG. 22 is required to have approximately 307,200×0.05=15,360 bits. In the above case, the peripheral circuits such as the switching circuit can be remarkably simplified.

Figure 24:
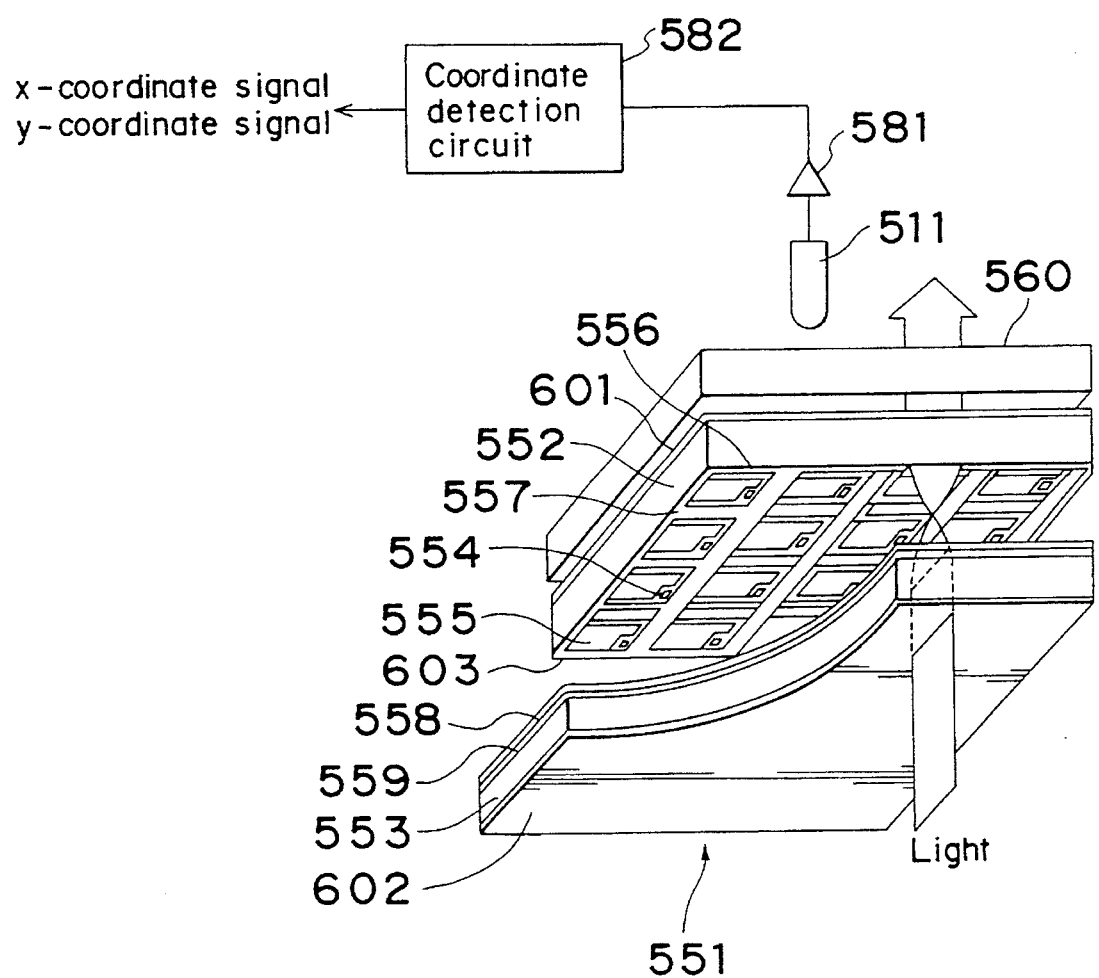
FIG. 24 is a schematic view of a TFT (thin film transistor) LCD panel.

FIG. 24 shows an embodiment of a tablet employing a TFT (Thin Film Transistor) LCD panel 551 instead of the duty type LCD panel. The TFT LCD panel 551 has glass substrates 552 and 553. On the glass substrate 552 are formed source bus line electrodes 557 which serve as first electrodes and gate bus lines 556 which serve as second electrodes while intersecting the source bus line electrode 557, where a TFT 554 is provided at each intersection of the electrodes 556 and 557.

The glass substrate 553 is provided with an opposite electrode 558 on its surface, and a display material (not shown) is interposed between the glass substrate 553 and the glass substrate 552. An electronic pen 511 is arranged on the side of the glass substrate 552 and electrostatically coupled with the first electrodes 557 and the second electrodes 556. There are further included a pixel electrode 555, a coordinate detection circuit 582, an amplifier 581, a protection plate 560, a color filter 559, polarizing plates 601 and 602, and an alignment film 603.

Second embodiment

In a display-integrated type tablet device in accordance with a second embodiment, a coordinate detection frequency is made higher than 72 cycles per second without changing a display image frame frequency.

Figure 3:
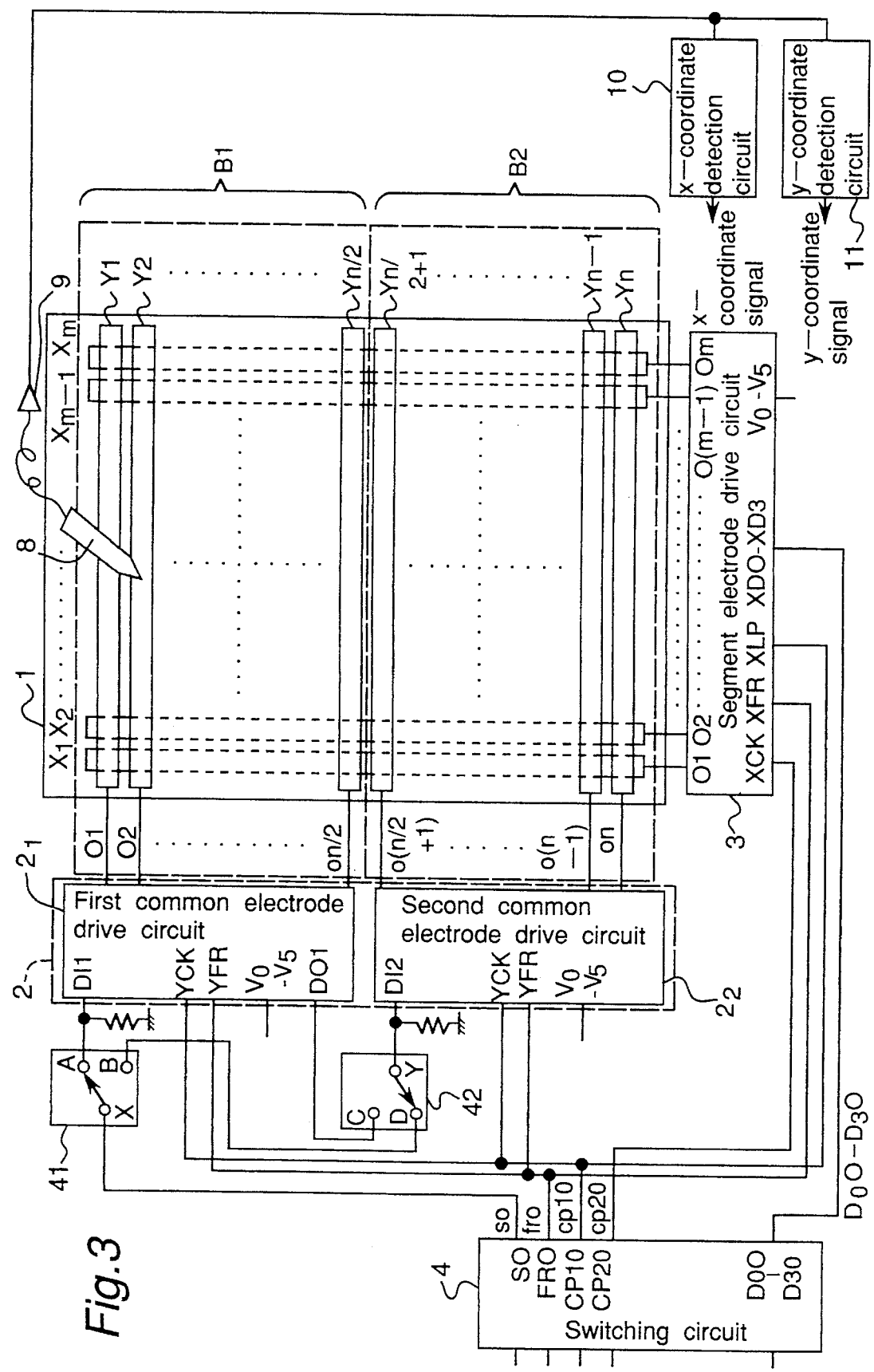
FIG. 3 is a block diagram of an LCD panel drive section in accordance with another embodiment of the present invention.

FIG. 3 is a block diagram of an LCD panel drive section of a display-integrated type tablet device in accordance with the second embodiment, wherein each component having the same function as that of the corresponding component of the display-integrated type tablet device shown in FIG. 14 is denoted by the same numeral, and no description therefor is provided herein.

In FIG. 3, there are not shown the display control circuit 5, detection control circuit 6, control circuit 7, and DC power supply circuit 12 as shown in FIG. 14.

The display panel 1 has n number of common electrodes Y wherein a region to which common electrodes $Y_1$ through $Y_{n/2}$ belong are defined as a first block B1 of the display panel 1, while a region to which common electrodes $Y_{n/2+1}$ through $Y_n$ belong are defined as a second block B2 of the display panel 1.

The common electrode drive circuit 2 is composed of a first common electrode drive circuit $2_1$ for driving the common electrodes Y existing in the first block B1 and a second common electrode drive circuit $2_2$ for driving the common electrodes Y existing in the second block B2. Meanwhile, the segment electrode drive circuit 3 drives all the segment electrodes X in the same manner as in the segment electrode drive circuit 3 shown in FIG. 14.

The first common electrode drive circuit $2_1$ and the second common electrode drive circuit $2_2$ are each provided with a shift register. Then shift data so from the switching circuit 4 is input to a shift data input terminal DI1 of the shift register of the first common electrode drive circuit $2_1$ and to a shift data input terminal DI2 of the shift register of the second common electrode drive circuit $2_2$.

In the above case, the input line of the shift data so is switched to the side of the first common electrode drive circuit $2_1$ or to the side of the second common electrode drive circuit $2_2$ by means of a multiplexer 41 and a multiplexer 42.

Figure 4:
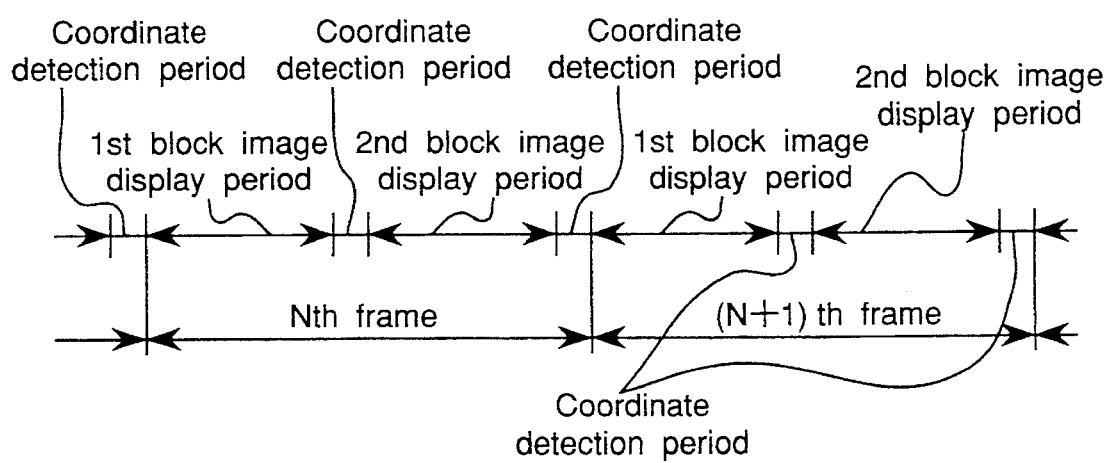
FIG. 4 is an exemplified image display/coordinate detection timing chart of the operation of the LCD panel drive section shown in FIG. 3.

The display-integrated type tablet device having the above-mentioned construction operates according to an image display/coordinate detection timing chart as shown in FIG. 4. In the image display/coordinate detection timing chart, the image display period in each frame is separated into a first block image display period in which an image is displayed in the first block B1 and a second block image display period in which an image is displayed in the second block B2, while a coordinate detection period is provided in two sections of a section between the first block image display period and the second block image display period and a section subsequent to the second block image display period.

Thus by setting up the coordinate detection period two times in one frame, a coordinate detection frequency of 120 cycles per second can be obtained with respect to a frame frequency of 60 frames per second.

The display-integrated type tablet device executes image display on the LCD panel 1 and detection of the coordinates at the tip end of the detection pen 8 by controlling switching of the multiplexer 41 and the multiplexer 42 by means of, for example, the control circuit 7 (refer to FIG. 14) according to Table 1 shown below.

TABLE 1

|  | Multiplexer 41 | Multiplexer 42 |
| --- | --- | --- |
| First block image display period | Output terminal A | Input terminal D |
| Second block image display period | Output terminal B | Input terminal D |
| Coordinate detection period | Output terminal A | Input terminal C |

In detail, the multiplexer 41 is switched to select the output terminal A in the first block image display period, while the multiplexer 42 is switched to select the input terminal D. Then the switching circuit 4 is switched so as to select the output signal from the display control circuit 5.

Then in synchronization with the clock signal cp2o for image display from the switching circuit 4, the display data $D_0$o through $D_3$o are sequentially taken into the shift register of the segment electrode drive circuit 3. When the display data of one line has been thus taken in, the segment electrode drive circuit 3 applies a drive pulse of the segment electrode drive signal corresponding to the display data taken in the shift register to the corresponding segment electrode X in synchronization with the clock signal cp1o for image display from the switching circuit 4.

At the same time, a pulse of the shift data so for image display from the switching circuit 4 is input to the shift data input terminal DI1 of the first common electrode drive circuit $2_1$ via the multiplexer 41 to be taken into the shift register. Then an output terminal 01 is firstly selected to apply a drive pulse of the common electrode drive signal to the common electrode $Y_1$ to display an image on the pixels in the first line.

When the image display in the first line relevant to the common electrode $Y_1$ is completed, data in the shift register of the first common electrode drive circuit $2_1$ are successively shifted in synchronization with the clock signal cp1o, and the segment electrode drive circuit 3 repeats the above-mentioned operation to display an image sequentially in the second and subsequent lines.

When the image display in the n/2th line relevant to the common electrode $Y_{n/2}$ is thus finished to complete the first block image display period, the contents of the shift registers of the first and second common electrode drive circuits $2_1$ and $2_2$ and the segment electrode drive circuit 3 are erased, and the device operation enters into the coordinate detection period.

In the coordinate detection period, the multiplexer 41 is switched to select the output terminal A, while the multiplexer 42 is switched to select the input terminal C. Further the switching circuit 4 is switched so as to select the output signal from the detection control circuit 6.

Then in synchronization with the clock signal cp2o for coordinate detection from the switching circuit 4, the segment electrode drive circuit 3 successively applies a scanning pulse of the segment electrode scanning signal to each segment electrode X to scan the segment electrode X.

When the x-coordinate detection period is thus finished, then the pulses of the shift data so input to the shift data input terminal DI1 of the first common electrode drive circuit $2_1$ are successively shifted in synchronization with the clock signal cp1o for coordinate detection from the switching circuit 4 to apply the scanning pulses of the common electrode scanning signal to scan the common electrodes $Y_1$ through $Y_{n/2}$ belonging to the first block B1.

When a scanning pulse is applied to the common electrode $Y_{n/2}$ to complete the scanning of the common electrodes $Y_1$ through $Y_{n/2}$ belonging to the first block B1, the pulses of the shift data so for coordinate detection are output from a shift data output terminal DO1 of the first common electrode drive circuit $2_1$ to the input terminal C of the multiplexer 42. Then the pulses are input to the shift data input terminal DI2 of the second common electrode drive circuit $2_2$ via an output terminal Y of the multiplexer 42.

Subsequently, in the same manner as in the case of the first common electrode drive circuit $2_1$, the second common electrode drive circuit $2_2$ scans the common electrodes $Y_{n/2+1}$ through $Y_n$ belonging to the second block B2 in synchronization with the clock signal cp1o for coordinate detection to finish the y-coordinate detection period.

In the above case, each of the clock signals cp1o and cp2o for coordinate detection is of course required to have a frequency which can achieve a coordinate detection frequency of at least 120 cycles per second.

When the x-coordinate detection period and the y-coordinate detection period has thus finished to complete the coordinate detection period, the contents of the shift registers of the first and second common electrode drive circuits $2_1$ and $2_2$ and the segment electrode drive circuit 3 are erased, and the device operation enters into the second block image display period.

In the second block image display period, the multiplexer 41 is switched to select the output terminal B, while the multiplexer 42 is switched to select the input terminal C. Then the switching circuit 4 is switched so as to select the output signal from the display control circuit 5.

Consequently, the pulses of the shift data so for image display from the switching circuit 4 are input to the shift data input terminal DI2 of the second common electrode drive circuit $2_2$ via the multiplexer 41 and the multiplexer 42.

Subsequently, the second common electrode drive circuit $2_2$ operates in the same manner as the operation of the first common electrode drive circuit $2_1$ in the first block image display period to display an image from the (n/2+1)th line relevant to the common electrode $Y_{n/2+1}$ to the nth line relevant to the common electrode $Y_n$ in the second block B2.

By separating the common electrode drive circuit 2 into the first common electrode drive circuit $2_1$ for driving the first block B1 and the second common electrode drive circuit $2_2$ for driving the second block B2 in a manner as described above, the shift data so for image display can be directly input to the shift data input terminal DI2 of the second common electrode drive circuit $2_2$ in the second block image display period. With the above-mentioned arrangement, the drive pulses can start to be applied from the common electrode $Y_{n/2+1}$ immediately after the device operation enters into the second block image display period, which allows a time corresponding to the time of shifting the pulses of the shift data so from the output terminal O1 to an output terminal On/2 in the case where the common electrodes Y belonging to the block B2 are driven by one common electrode drive circuit to be "0".

Thus the possible degradation of a display image due to the reduction of the duty ratio of the image display period is prevented, and the possible degradation of contrast due to the fact that the common electrodes belonging to the first block B1 are driven in the data shifting time in the second block image display period is prevented.

The following describes an exemplified LCD panel drive circuit in executing coordinate detection after image display in blocks by separating the LCD panel 1 into the first block B1 and the second block B2. Note that the example described below is an example employing the display control circuit 5 for the normal LCD panel having no tablet function as in the first embodiment, and therefore the description is made with reference to FIG. 1.

As is evident from the above description, it is required to input a pulse of the shift data so for image display to the shift data input terminal DI1 of the first common electrode drive circuit $2_1$ in order to start the first block image display period and input the pulse to the shift data input terminal DI2 of the second common electrode drive circuit $2_2$ in order to start the second block image display period. In other words, it is required to insert a pulse in the shift data so at the beginning and in the middle of one frame period.

Therefore, the new shift data generator 24 of the present embodiment generates the first pulse of the new shift data $s_n$ upon detection of a pulse of the shift data s from the display control circuit 5. Subsequently, the number of pulses of the input new clock signal $cp1_n$ is counted, and when the count number reaches the number of "a half of the total number of common electrodes", the second pulse is generated.

It is noted that the LCD panel drive circuit of the present embodiment is not limited to the above-mentioned circuit, and the circuit is essentially required to be a circuit which can insert two pulses into the shift data so in one frame period.

Thus in the present embodiment, the LCD panel 1 is separated into the first block B1 and the second block B2, the common electrodes Y belonging to the first block B1 are driven by the first common electrode drive circuit $2_1$, and the common electrodes Y belonging to the second block B2 are driven by the second common electrode drive circuit $2_2$. The line of the shift data so for image display from the switching circuit 4 to the common electrode drive circuit 2 is switched by the two multiplexers 41 and 42.

Then an image is displayed in the first block B1 by firstly switching the line of the shift data so for image display to the multiplexer 41→shift data input terminal DI1. Then the LCD panel 1 is scanned by switching the line of the shift data so for image display to the multiplexer 41→shift data input terminal DI1→shift data output terminal DO1→multiplexer 42→shift data input terminal DI2. Then an image is displayed in the second block B2 by switching the line of the shift data so for image display to the multiplexer 41→multiplexer 42→shift data input terminal DI2. Then the LCD panel 1 is scanned by switching the line of the shift data so for image display to the multiplexer 41→shift data input terminal DI1→shift data output terminal DO1→multiplexer 42→shift data input terminal DI2.

Therefore, the coordinate detection period can be set up two times in one frame period to allow a stable image to be displayed without flicker by setting the frame frequency of image display at 60 frames per second and allow a coordinate detection frequency higher than 72 cycles per second to be obtained. Consequently, the traces of a letter or a symbol written at high speed can be obtained with higher accuracy through averaging of coordinate detection values obtained in plural times.

It is noted that the first common electrode drive circuit $2_1$ and the second common electrode drive circuit $2_2$ are allowed to be constructed in units of LSI. For instance, when each of the first block B1 and the second block B2 of the LCD panel 1 has 200 output terminals (i.e., when the LCD panel 1 has 400 common electrodes), each of the blocks B1 and B2 are composed of two display drive LSIs each having a 100-channel shift register. However, the above arrangement is not limitative. For instance, a device having four 50-channel shift registers in a form as if the first common electrode drive circuit $2_1$ and the second common electrode drive circuit $2_2$ are formed in one chip may be used.

In the above-mentioned embodiment, the coordinate detection period is set up two times in one frame period. However, the number of the coordinate detection periods is not limited to any integer in the present invention, and the period may be set up one time in several frames when a cursor display or a menu display are to be designated.

The multiplexer 41 or the multiplexer 42 may be an analog switch.

Third embodiment

In the above-mentioned second embodiment, one display screen is composed of one LCD panel, and the LCD panel is separated into two blocks to be driven in blocks (so-called the one-screen system). However, in the case of a large display screen or a high-resolution display screen having a great number of electrodes, one display screen is composed of a plurality of LCD panels and the LCD panels are driven by different drive circuits (so-called the two-screen system, four-screen system, . . . ).

The third embodiment is an embodiment which allows a high coordinate detection frequency in the multi-screen system as described above.

Figure 5:
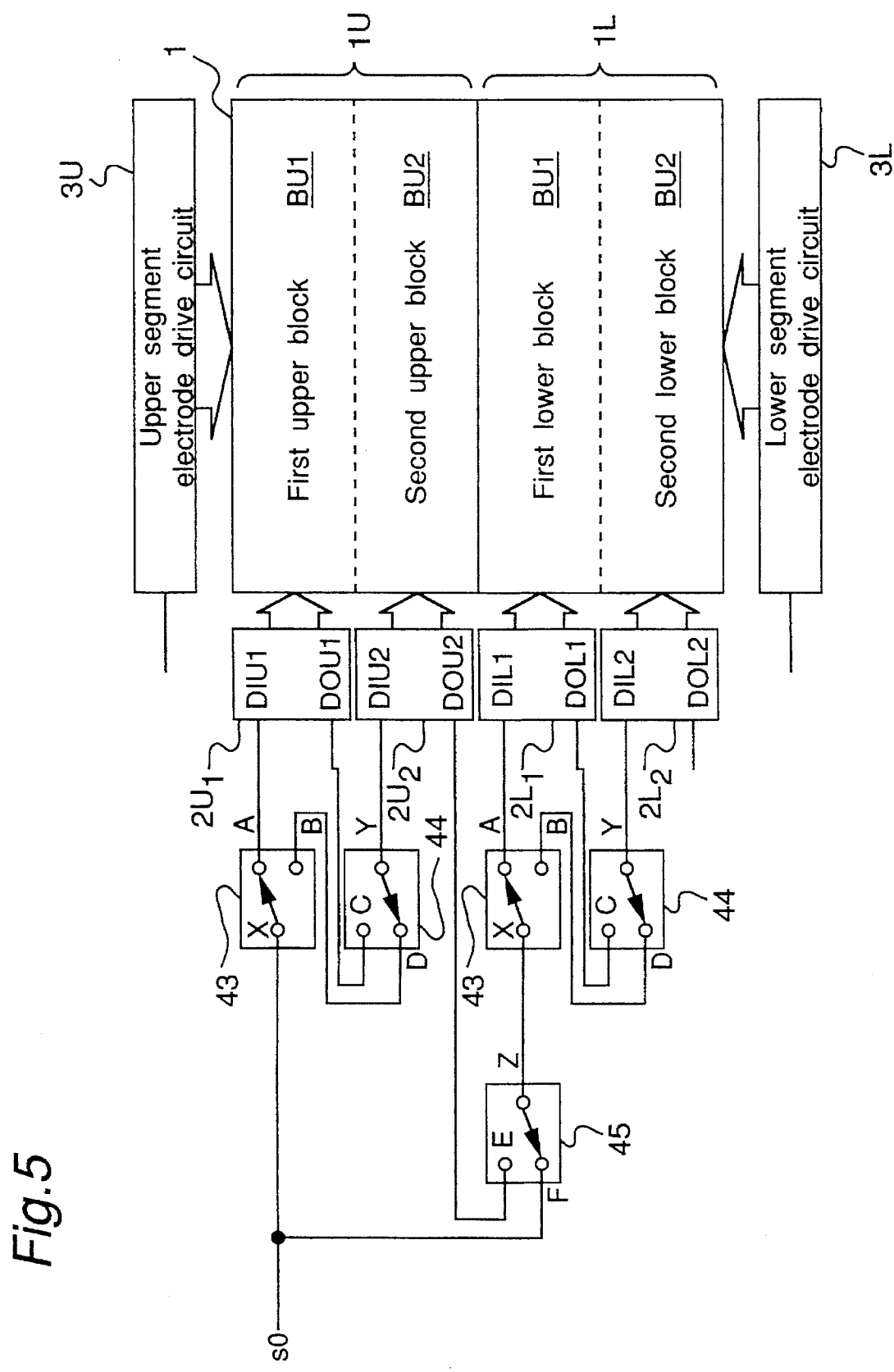
FIG. 5 is a block diagram of a portion of an LCD panel drive section in a two-screen system different from those shown in FIGS. 1 and 3.

FIG. 5 is a block diagram of an LCD panel drive section according to the two-screen system. An LCD panel 1 is constructed by connecting two LCD panels vertically in FIG. 5, where the LCD panel placed in the upper position is referred to as the upper LCD panel 1U, and the LCD panel placed in the lower position is referred to as the lower LCD panel 1L.

The upper LCD panel 1U is separated into a first upper block BU1 and a second upper block BU2, while the lower LCD panel 1L is separated into a first lower block BL1 and a second lower block BL2 in the same manner as in the second embodiment.

The upper LCD panel 1U is driven by a first upper common electrode drive circuit $2U_1$, a second upper common electrode drive circuit $2U_2$, and an upper segment electrode drive circuit 3U. On the other hand, the lower LCD panel 1L is driven by a first lower common electrode drive circuit $2L_1$, a second lower common electrode drive circuit $2L_2$, and a lower segment electrode drive circuit 3L.

In the above case, shift data so is input to the first upper common electrode drive circuit $2U_1$ and the second upper common electrode drive circuit $2U_2$ via a multiplexer 43 (corresponding to the multiplexer 41) or a multiplexer 44 (corresponding to the multiplexer 42) in the same manner as in the one-screen system shown in FIG. 3. Meanwhile, the shift data so is input to the first lower common electrode drive circuit $2L_1$ and the second lower common electrode drive circuit $2L_2$ via the multiplexer 43 or the multiplexer 44 in the same manner as above.

The present embodiment is further provided with a multiplexer 45 of which input terminal E is connected to a shift data output terminal $DOU_2$ of the second upper common electrode drive circuit $2U_2$, and the shift data so from a switching circuit (not shown) is input to an input terminal F thereof.

The display-integrated type tablet device of the present embodiment executes image display and coordinate detection according to a timing as follows.

First, images are displayed in parallel in the first upper block BU1 and the first lower block BL1 (first block parallel image display). Subsequently, the entire LCD panel 1 is scanned to execute coordinate detection. Subsequently, images are displayed in parallel in the second upper block BU2 and the second lower block BL2 (second block parallel image display). Subsequently, the entire LCD panel 1 is scanned to execute coordinate detection.

In the above case, the multiplexers are switched according to Table 2 as follows.

TABLE 2

|  | Multiplexer 43 | Multiplexer 44 | Multiplexer 45 |
| --- | --- | --- | --- |
| First block parallel image display period | Output terminal A | Input terminal D | Input terminal F |
| Second block parallel image display period | Output terminal B | Input terminal D | Input terminal F |
| Coordinate detection period | Output terminal A | Input terminal C | Input terminal E |

It is noted that the drive method of the blocks BU1, BU2, BL1, and BL2 is the same as described in the second embodiment, and therefore no description therefor is provided herein.

In the present embodiment, the segment electrodes constituting the upper LCD panel 1U are not continuous with the segment electrodes constituting the lower LCD panel 1L. However, the upper LCD panel 1U and the lower LCD panel 1L are required to operate as if they were single LCD panel 1 in the coordinate detection period. Therefore, the upper segment electrode drive circuit 3U and the lower segment electrode drive circuit 3L are required to operate exactly at the same timing in the x-coordinate detection period.

Fourth embodiment

The present embodiment is an embodiment which allows a high coordinate detection frequency in the four-screen system.

Figure 6:
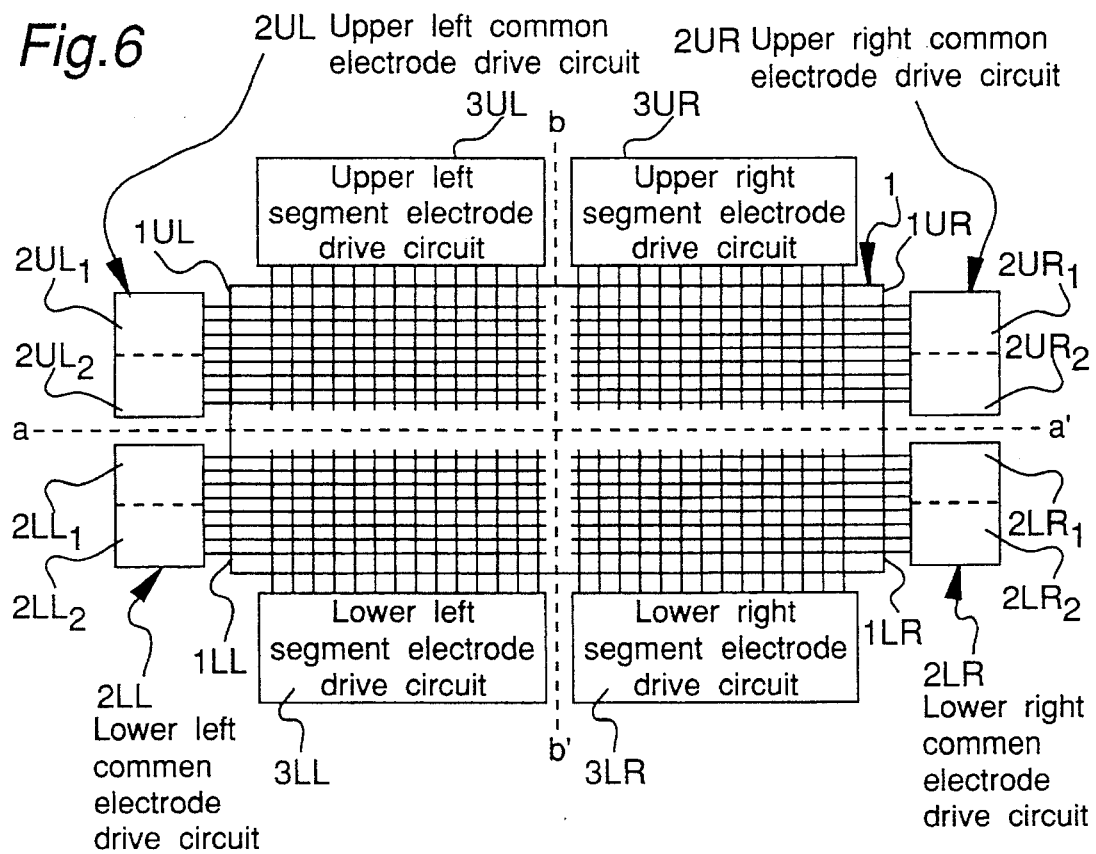
FIG. 6 is an explanatory view of the construction of an LCD panel for implementing a four-screen system.

FIG. 6 is an explanatory view of an LCD panel 1 for implementing the four-screen system. The LCD panel 1 is separated into four sections along the dotted line a-a' and the dotted line b-b', and each section is composed of an independent LCD panel.

An upper right LCD panel 1UR is driven by an upper right common electrode drive circuit 2UR and an upper right segment electrode drive circuit 3UR. Likewise, an upper left LCD panel 1UL is driven by an upper left common electrode drive circuit 2UL and an upper left segment electrode drive circuit 3UL. A lower right LCD panel 1LR is driven by a lower right common electrode drive circuit 2LR and a lower right segment electrode drive circuit 3LR. Likewise, a lower left LCD panel 1LL is driven by a lower left common electrode drive circuit 2LL and a lower left segment electrode drive circuit 3LL.

Furthermore, the LCD panels 1UR, 1UL, 1LR, and 1LL are each separated into a first block and a second block (in the same separation manner as shown in FIG. 5 though it is not definitely shown in FIG. 6). The first blocks are each driven by the corresponding first common electrode drive circuits $2UR_1$, $2UL_1$, $2LR_1$, and $2LL_1$. The second blocks are each driven by the corresponding second common electrode drive circuits $2UR_2$, $2UL_2$, $2LR_2$, and $2LL_2$.

The image display/coordinate detection timing of the display-integrated type tablet device of the present embodiment is basically the same as in the third embodiment. Practically, parallel image display in each of the first blocks of the LCD panels 1UR, 1UL, 1LR, and 1LL, scanning of the entire LCD panel 1, parallel image display in each of the second blocks of the LCD panels 1UR, 1UL, LR, and 1LL, and scanning of the entire LCD panel 1 are successively executed.

It is noted that the portion on the left side of the dotted line b-b' in FIG. 6 has the same construction as in FIG. 5, and the portion on the right side of the dotted line b-b' in FIG. 6 has a construction symmetrical to the construction shown in FIG. 5. Therefore, the display-integrated type tablet device of the present embodiment can be driven substantially in the same manner as in the display-integrated type tablet device of the third embodiment.

In the display-integrated type tablet device of the present embodiment, all the LCD panels 1UR, 1UL, 1LR, and 1LL are required to operate as if they were single LCD panel 1 in the coordinate detection period. Therefore, in the x-coordinate detection period, scanning is executed from the leftmost end to the rightmost end in FIG. 6 so that an upper left segment electrode drive circuit 3UL and a lower left segment electrode drive circuit 3LL operates exactly at the same timing and the segment electrode belonging to the LCD panel 1UL and the segment electrode belonging to the LCD panel 1LL operate as if they were forming one segment electrode. Subsequently, an upper right segment electrode drive circuit 3UR and a lower right segment electrode drive circuit 3LR simultaneously scan from the leftmost end to the rightmost end in FIG. 6 exactly at the same timing.

When the x-coordinate detection period is thus completed, the device operation enters into the y-coordinate detection period. Then an upper left common electrode drive circuit 2UL and an upper right common electrode drive circuit 2UR simultaneously scan from the uppermost end to the lowermost end in FIG. 6 exactly at the same timing. Subsequently, a lower left common electrode drive circuit 2LL and a lower right common electrode drive circuit 2LR simultaneously scan from the uppermost end to the lowermost end in FIG. 6 exactly at the same timing.

Fifth embodiment

Figure 7:
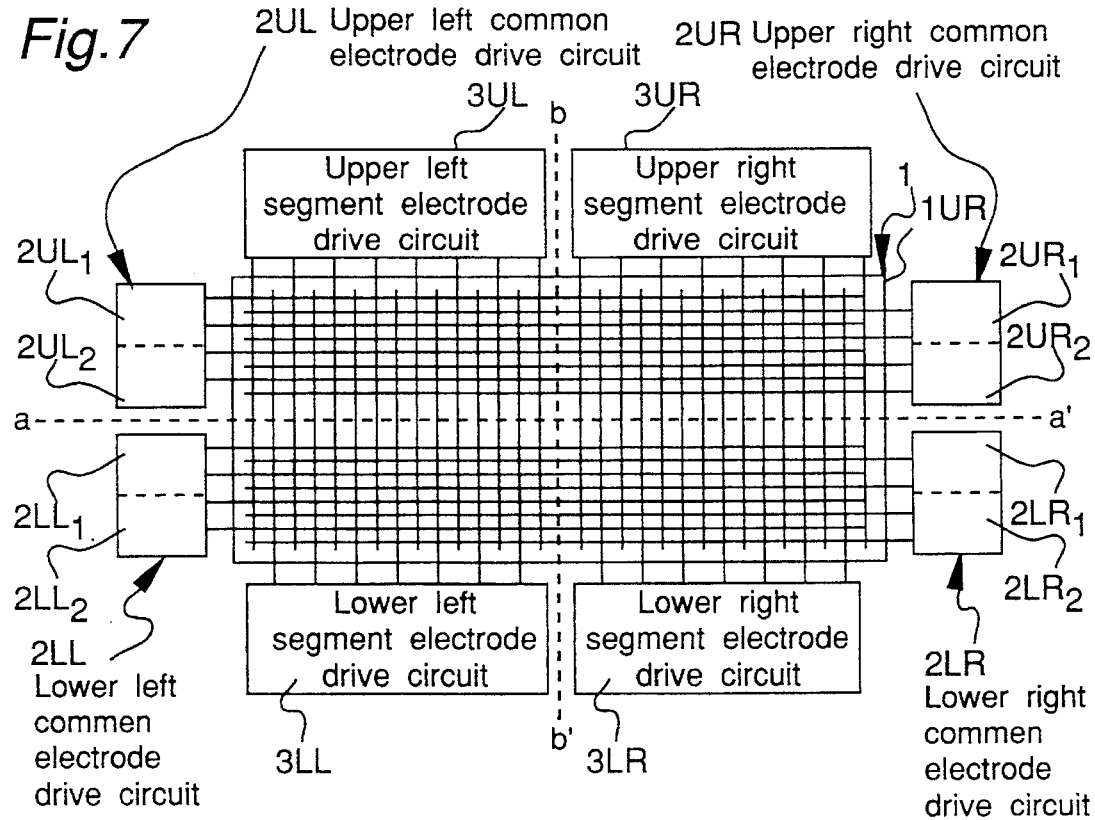
FIG. 7 is an explanatory view of the construction of an LCD panel for implementing a four-screen system different from the one shown in FIG. 6.

A display-integrated type tablet device in accordance with the fifth embodiment as shown in FIG. 7 is a modification of the display-integrated type tablet device shown in FIG. 6.

In the display-integrated type tablet device, each of the segment electrode X and common electrode Y has a length covering the LCD panel 1 from one end to the other end in the same manner as in the display-integrated type tablet device shown in FIG. 3. Then segment electrodes X extending from the segment electrode drive circuits 3UR and 3LR which are opposite to each other or from the segment electrode drive circuits 3UL and 3LL which are opposite to each other are alternately arranged. Likewise, common electrodes Y extending from the common electrode drive circuits 2UR and 2UL which are opposite to each other or from the common electrode drive circuits 2LR and 2LL which are opposite to each other are alternately arranged.

In driving the LCD panel 1 of the above-mentioned display-integrated type tablet device, the panel can be driven in the same manner as in the display-integrated type tablet device shown in FIG. 6, when the following points of requirement must be satisfied.

The first point is that, since different segment electrode drive circuits are used for driving adjoining segment electrodes X, the display data $D_0$ through $D_3$ to be taken in each segment electrode drive circuit are required to be the data corresponding to every other pixel. The second point is that, since the segment electrode drive circuits for driving adjoining segment electrodes X are opposite to each other and the common electrode drive circuits for driving adjoining common electrodes Y are opposite to each other, the drive/scanning timing of the segment electrode drive circuits or the common electrode drive circuits opposite to each other is required to be not simultaneously but shifted by half cycle of the clock signal in sequentially driving or scanning the segment electrodes X or the common electrodes Y.

In the case of the above-mentioned display-integrated type tablet device, the electrodes to be driven by each drive circuit can be reduced in number to obtain an LCD panel having the same electrode density as compared with the display-integrated type tablet device shown in FIG. 6. Therefore, a high-density LCD panel can be driven or scanned at relatively slow speed.

In the case of the embodiments shown in FIGS. 6 and 7, the total number or the electrode density of the segment electrodes X and the common electrodes Y can be easily increased. Therefore, the above arrangement is very effective for allowing the LCD panel to be finer or dimensionally increased.

Sixth embodiment

A display-integrated type tablet device in accordance with the sixth embodiment is to eliminate distortion in detecting the coordinates at the tip end of a detection pen by reducing a propagation delay of a scanning pulse applied to a segment electrode or a common electrode in a manner as described above.

When the LCD panel of each of the aforementioned display-integrated type tablet devices is viewed in regard to its coordinate detection function, it is preferred that an applied scanning pulse has a shorter delay time. Contrary to the above, it is not easy nor advantageous to reduce the dielectric constant of the liquid crystals for the purpose to reduce the electrostatic capacitance between the segment electrode X and the common electrode Y which are intersecting each other with interposition of the liquid crystals in consideration of the compatibility with the accuracy in image display.

Normally in an LCD panel, segment electrodes and common electrodes are formed by uniformly forming a transparent electrode film composed of indium oxide and tin oxide on a glass plate and then etching the same.

When making the thus formed LCD panel effect only its image display function, it is sufficient for the transparent electrode film on the glass plate to have a sheet resistance of 20 $\Omega/\square$ to 30 $\Omega/\square$, and LCD panels having a specification on the above level are practically used in almost all the cases. However, when the LCD panel is provided with a tablet function, the resulting detection coordinates are significantly distorted when the panel has a resistance on the above level.

Therefore, the inventor of the present invention conducted various researches on the resistance of the above-mentioned transparent electrode film, and discovered the fact that the delay characteristics of the applied scanning pulse are remarkably improved by reducing the sheet resistance below 15 $\Omega/\square$. The reduction of the electric resistance of the LCD panel below 15 $\Omega/\square$ allows the delay characteristics to be improved and allows the tailing characteristics in image display to be remarkably improved to thereby improve the image display characteristics.

It is noted that the cost of the transparent electrode film slightly increases when the resistance of the transparent electrode film is reduced. However, the cost increase is an ignorable cost increase when it is compared with the cost of the display-integrated type tablet device in which an LCD and an electrostatic induction type tablet are stacked on each other as in the conventional practice.

Seventh embodiment

A display-integrated type tablet device in accordance with the seventh embodiment is to reduce a ratio of a delay time of an applied scanning pulse to a scanning pulse cycle by reducing a electrode scanning speed, i.e. lengthen the scanning pulse cycle.

In the above case, when both the segment electrode scanning speed and the common electrode scanning speed are reduced, the coordinate detection period is increased which results in degrading the image display quality. Therefore, in the present embodiment, the scanning speed of only one electrode is reduced.

Normally, the display screen of an LCD panel is rectangular, and therefore the common electrode and the segment electrode have different lengths. Particularly in the most general two-screen type LCD panel (refer to FIG. 5), the segment electrodes are separated in the upper LCD panel and the lower LCD panel. Therefore, the length of the segment electrode is smaller than one third of the length of the common electrode (note that the illustration in FIG. 5 does not indicate that the segment electrode has a length smaller than one third of the length of the common electrode for simplicity). Therefore, the propagation delay of the scanning pulse in the segment electrode can be practically ignored.

In contrast to the above, the propagation delay of the scanning pulse in the common electrode cannot be ignored, and the degree of delay varies depending on the content of the image displayed. Therefore, it is desired that the delay time in the common electrode be as short as possible.

The inventor of the present invention conducted various experiments, and discovered the fact that the distortion of the detection coordinate in the y-direction can be almost ignored in practice by setting the common electrode scanning speed at a frequency of about 1.5 MHz. In such a case, the variation in degree of the distortion of the detection coordinate in the y-direction depending on the change of content of the image displayed can be also ignored.

Thus by reducing the scanning speed of the common electrodes which are great in length and small in number to 1.5 MHz, the accuracy in detecting the coordinates at the tip end of the detection pen can be increased without significantly increasing the duration of the coordinate detection period.

The reduction of the common electrode scanning speed is effected by reducing the frequency of the clock signal for controlling the shift frequency of the shift register of the common electrode drive circuit. In such a case, the frequency of the clock signal for the segment electrode drive circuit and the frequency of the clock signal for the common electrode drive circuit are not independently set up but set up so that they are in a ratio of an integer.

The above-mentioned arrangement is appropriate for calculating the coordinates at the tip end of the detection pen based on the time to the generation of an induction voltage at the detection pen in the x-coordinate detection period or the y-coordinate detection period and the scanning pulse application timing.

Furthermore, when the frequency of the clock signal of the segment electrode drive circuit is different from the frequency of the clock signal of the common electrode drive circuit, the average value of a DC voltage across both the electrodes can be made to be "0" V to allow the liquid crystals from being deteriorated due to the possible electrolysis of the liquid crystals so long as the scanning time per electrode (i.e., the pulse width of the shift data so) is identical in both the electrodes.

Eighth embodiment

A display-integrated type tablet device in accordance with the eighth embodiment is to reduce the propagation delay time of a scanning pulse in the electrodes by optimizing the structure of a LCD panel.

In the four-screen type display-integrated type tablet device as shown in FIG. 6, one display screen is composed of four LCD panels. For the above reason, each of the segment electrode X and the common electrode Y has a short length and a low resistance. Therefore, the degree of the propagation delay is lowered to improve the linearity of detection coordinates.

Although there is generated a distortion of detection coordinate in a center portion of the display screen, the degree is very low and ignorable.

In the display-integrated type tablet device shown in FIG. 7, the ends of the segment electrodes X are connected half and half in number to the opposed segment drive circuits, and the ends of the common electrodes Y are connected half and half in number to the opposed common drive circuits. Therefore, the degree of delay in the lengthwise direction of all the electrodes is averaged to improve the linearity of the detection coordinates.

Although the detection coordinates are slightly distorted in an upper portion, a lower portion, a right portion, and a left portion of the display screen, it can be corrected by a simple software.

By incorporating the sixth embodiment and the seventh embodiment into the display-integrated type tablet device shown in FIG. 6 or the display-integrated type tablet device shown in FIG. 7, the distortion of the detection coordinates can be more effectively reduced.

Ninth embodiment

Figure 9A:
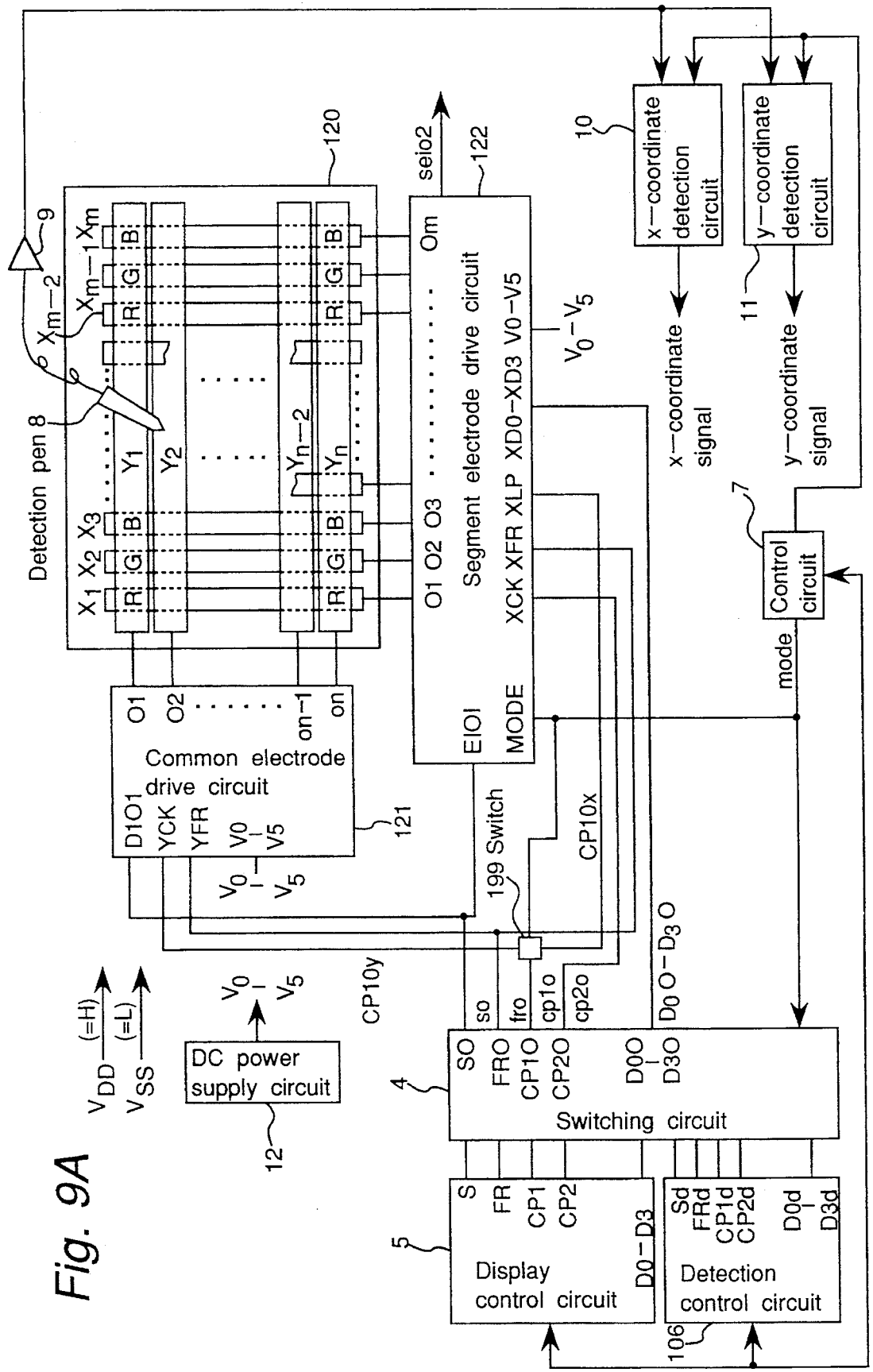
FIG. 9A is a block diagram of another embodiment.
Figure 20:
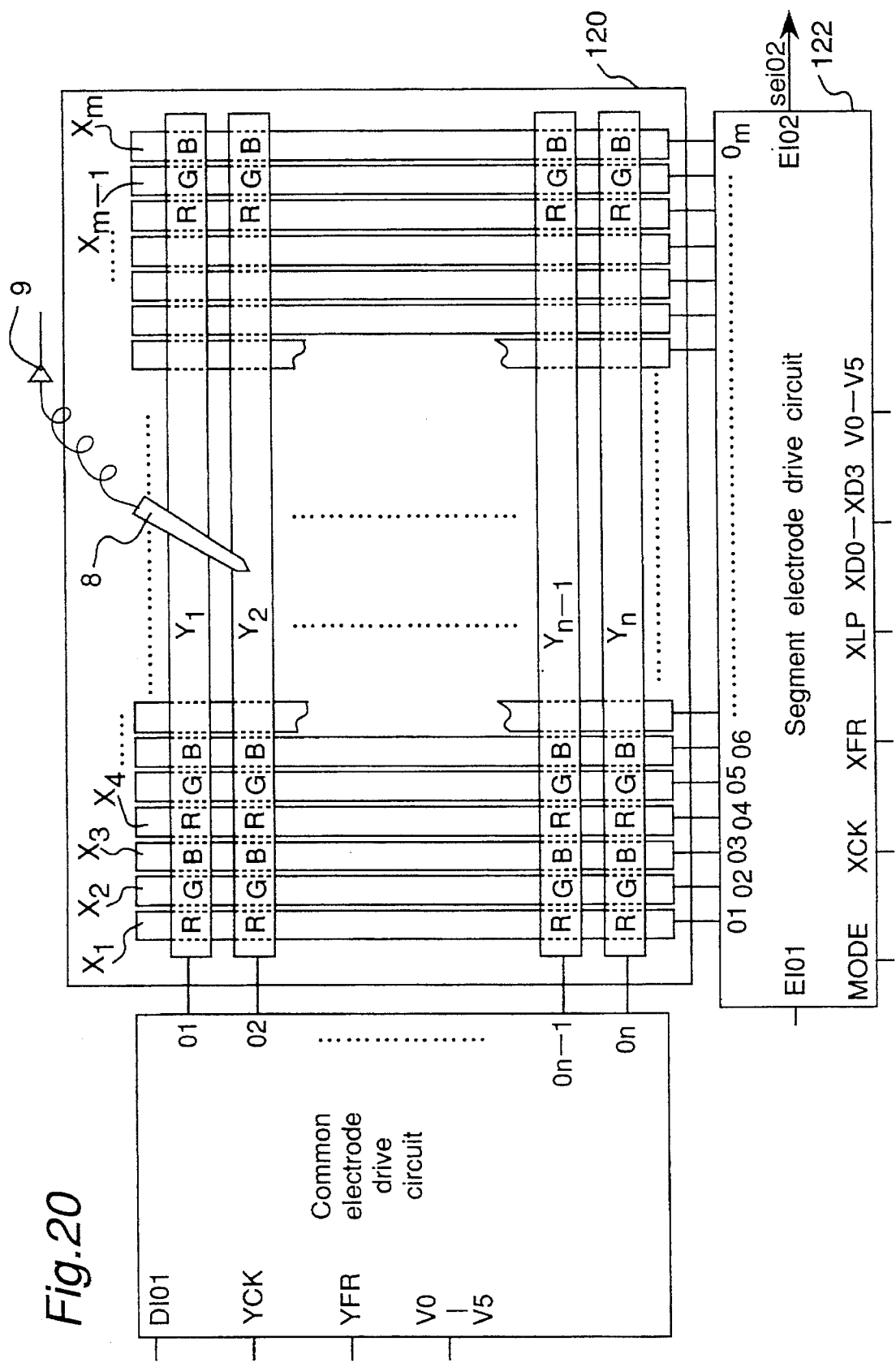
FIG. 20 is a block diagram of an LCD panel and a drive circuit therefor in the case where the display-integrated type tablet device shown in FIG. 14 is used for color image display.
Figure 21:
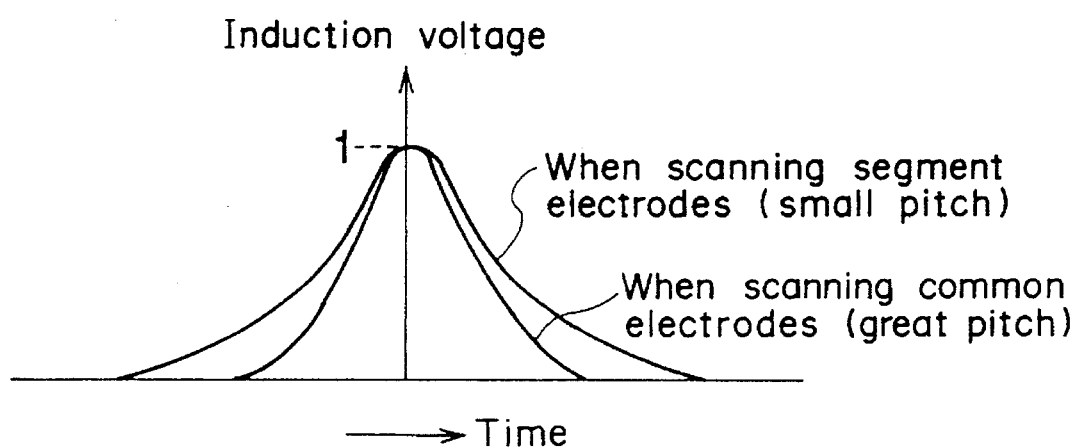
FIG. 21 is a graph showing waveforms of a voltage induced at the detection electrode of the detection pen when a LCD panel for color image display shown in FIG. 20 is scanned.

The constructions of a LCD panel 120, common electrode drive circuit 121, and segment electrode drive circuit 122 of a display-integrated type tablet device in accordance with the ninth embodiment as shown in FIG. 9A are the same as those of the LCD panel 120, common electrode drive circuit 121, and segment electrode drive circuit 122 as shown in FIG. 20. The basic constructions of the switching circuit 4, display control circuit 5, control circuit 7, detection pen 8, amplifier 9, x-coordinate detection circuit 10, y-coordinate detection circuit 11, DC power supply circuit 12, and so forth of the display-integrated type tablet device of the ninth embodiment are the same as in the display-integrated type tablet device shown in FIG. 14. It is noted that a frequency of a clock signal cp1d output from a detection control circuit 106 in the x-coordinate detection period is different from the frequency of the signal in the y-coordinate detection period. In FIG. 9A, the same components as in FIGS. 14 and 20 are denoted by the same numerals as in FIGS. 14 and 20, and no detailed description therefor is provided herein.

FIG. 8 is a timing chart of a segment electrode scanning signal x and a common electrode scanning signal y in scanning the LCD panel 120 of the display-integrated type tablet device of the present embodiment.

In the display-integrated type tablet device of the present embodiment as shown in FIG. 8, the frequency of the clock signal cp1o output from the switching circuit 4 in the x-coordinate detection period is made different from the frequency of the signal in the y-coordinate detection period. Then the segment electrode scanning clock signal $cp1o_x$ for scanning the segment electrodes X having an electrode density approximately three times as great as the electrode density of the common electrodes Y is made to have a frequency three times as great as the frequency of the common electrode scanning clock signal $cp1o_y$.

Thus by making the frequency of the segment electrode scanning clock signal $cp1o_x$ three times as great as the frequency of the common electrode scanning clock signal $cp1o_y$, the scanning speed in the x-direction is made approximately equal to the scanning speed in the y-direction. As a result, the waveform of the voltage induced at the detection electrode of the detection pen 8 in scanning the segment electrodes X having a small pitch is made approximately equal to the waveform of the voltage induced in scanning the common electrode Y having a great pitch, and therefore the x-coordinate detection accuracy and the y-coordinate detection accuracy at the tip end of the detection pen 8 are made approximately equal to each other.

It should be noted that the segment electrode scanning clock signal $cp1o_x$ and the common electrode scanning clock signal $cp1o_y$ are generically named as the clock signal cp1o.

The above-mentioned clock signal cp1o can be generated in a manner as follows.

In generating the clock signal cp1d in the detection control circuit 106, there is generated a clock signal cp1d having the same frequency as that of the segment electrode scanning clock signal $cp1o_x$ in the x-coordinate detection period. Meanwhile, there is generated a clock signal cp1d having the same frequency as that of the common electrode scanning clock signal $cp1o_y$ in the y-coordinate detection period. Then by a switch circuit 199 controlled by the control circuit 7, the clock signal cp1o from the output terminal CP1O of the switching circuit 4 is switchedly input to the clock input terminal YCK of the common electrode drive circuit 121 (in the y-coordinate detection period) or to the latch pulse input terminal XLP of the segment electrode drive circuit 122 (in the x-coordinate detection period).

With the above-mentioned arrangement, the segment electrode scanning clock signal $cp1o_x$ is input to the segment electrode drive circuit 122 in the x-coordinate detection period, while the common electrode scanning clock signal $cp1o_y$ is input to the common electrode drive circuit 121 in the y-coordinate detection period.

In the display-integrated type tablet device for color image display, the clock input terminal YCK of the common electrode drive circuit 121 and the latch pulse input terminal XLP of the segment electrode drive circuit 122 are both connected to the same output terminal CP1O of the switching circuit 4 (refer to FIG. 14). Therefore, in order to allow the segment electrode scanning clock signal $cp1o_x$ and the common electrode scanning clock signal $cp1o_y$ having mutually different frequencies as shown in FIG. 8 to be output, the clock signal cp1d generated in the detection control circuit 106 is required to change its frequency depending on whether it is in the x-coordinate detection period or in the y-coordinate detection period.

Tenth embodiment

Figure 9B:
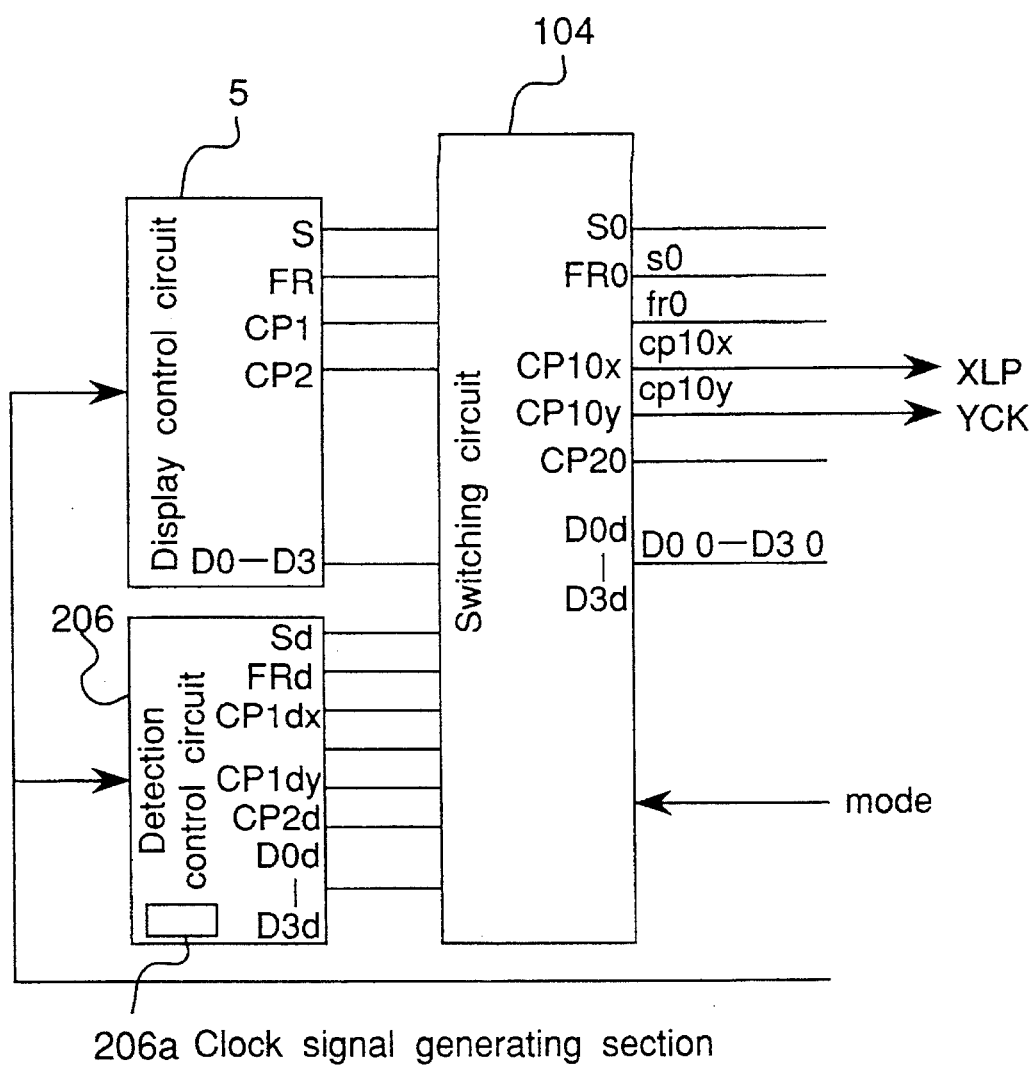
FIG. 9B is a block diagram of an essential portion of another embodiment.

In a display-integrated type tablet device for color image display in accordance with the tenth embodiment as shown in FIG. 9B, a clock output terminal of a detection control circuit 206 is composed of two clock output terminals $CP1d_x$ and $CP1d_y$, and two output terminals $CP1O_x$ and $CP1O_y$ corresponding to the output terminal CP1O of the ninth embodiment of the switching circuit 104 are provided. The output terminal $CP1O_x$ of the switching circuit 104 is connected to the latch pulse input terminal XLP of the segment electrode drive circuit 122, while the output terminal $CP1O_y$ of the switching circuit 104 is connected to the clock input terminal YCK of the common electrode drive circuit 121. The switch 199 of the ninth embodiment is not provided. The constructions of the other components are the same as in the ninth embodiment shown in FIG. 9A.

The detection control circuit 206 further generates two clock signals $cp1d_x$ and $cp1d_y$ having different frequencies. The clock signal $cp1d_x$ having the higher frequency is output from the clock output terminal $CP1O_x$, while the clock signal $cp1d_y$ is output from the clock output terminal $CP1O_y$.

With the above-mentioned arrangement, in generating the clock signal cp1d, the detection control circuit 206 is not required to change the frequency of the signal regardless of the time when the signal is generated in the x-coordinate detection period or in the y-coordinate detection period to allow a clock signal generating section 206a of the detection control circuit 206 to have a simple construction.

In the above case, by stopping the output of the common electrode scanning clock signal $cp1o_y$ in the x-coordinate detection period and stopping the output of the segment electrode scanning clock signal cp1ox in the y-coordinate detection period in a manner as shown in FIG. 8, the output of the clock signal cp1o which consumes much power because it has a high frequency in the coordinate detection period can be saved as far as possible.

Figure 10A:
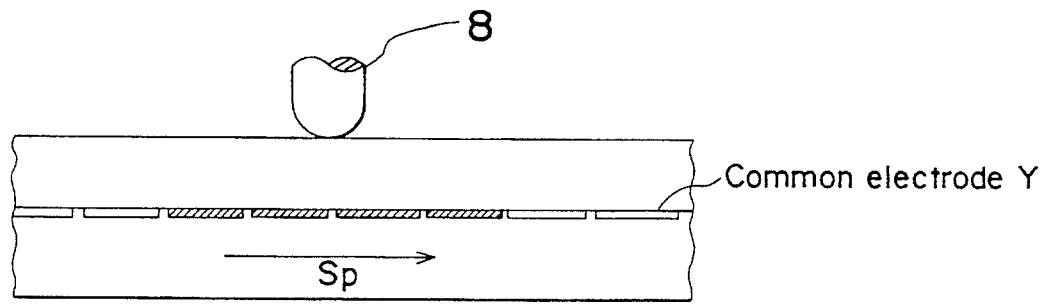
FIGS. 10A, 10B and 10C are explanatory views of electrodes in an active state to which a scanning voltage is applied in the coordinate detection period.
Figure 10B:
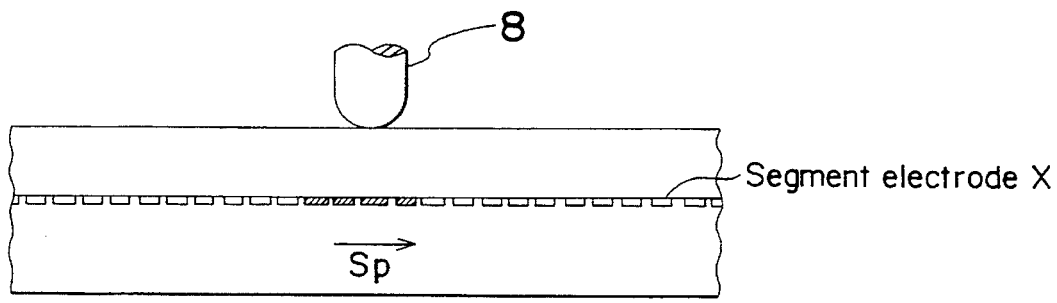
Figure 10C:
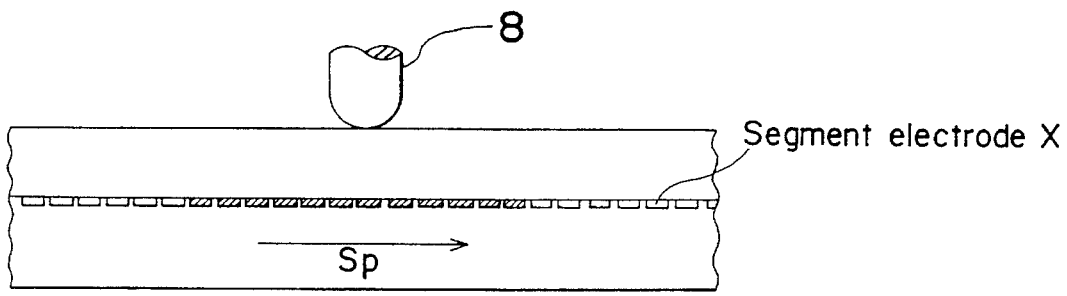

FIGS. 10A, 10B and 10C show electrodes which are in the active state (hatched) by receiving the segment electrode scanning signal x or the common electrode scanning signal y in the coordinate detection period. It is noted that "Sp" in FIGS. 10A, 10B and 10C indicate the scanning speed in the x-direction or the y-direction.

In the LCD panel 120 where the segment electrodes X and the common electrodes Y have different electrode densities as shown in FIG. 20, the numbers of electrodes to which the scanning pulses of the segment electrode scanning signal x and the common electrode scanning signal y respectively are applied are same in regard to the segment electrode X and the common electrode Y, the width of the electrodes in the active state is narrower in the segment electrodes X having a higher electrode density. Therefore, the electrostatic capacitance between the segment electrodes X and the detection electrode of the detection pen 8 is reduced to reduce the voltage induced at the detection electrode.

The number of electrodes to which the scanning pulse is simultaneously applied depends on the pulse width of the shift data so (refer to FIG. 8). In the present embodiment, the pulse width of the shift data so in the x-coordinate detection period is set up in 12 cycles of the segment electrode scanning clock signal $cplo_x$ in contrast to the case where the pulse width of the shift data so in the y-coordinate detection period is set up in 4 cycles of the common electrode scanning clock signal $cplo_y$ as shown in FIG. 8.

Therefore, in contrast to the fact that the scanning pulse is simultaneously applied to 4 common electrodes Y, the pulse is simultaneously applied to 12 segment electrodes X.

For the above reasons, when the electrode density of the segment electrodes X is three times as great as the electrode density of the common electrodes Y and the frequency of the segment electrode scanning clock signal $cplo_x$ is three times as great as the frequency of the common electrode scanning clock signal $cplo_y$, the scanning speed Sp is made same in the x-direction and the y-direction as shown in FIGS. 10A and 10C, and the width of the electrodes in the active state is also made same in both the electrodes X and Y. Consequently, the waveform of the voltage induced at the detection electrode of the detection pen 8 attributed to the scanning voltage $V_5$ applied to the segment electrodes X is made approximately equal to the waveform of the induction voltage attributed to the scanning voltage $V_5$ applied to the common electrodes Y.

The arrangement that the waveforms of the two voltages induced at the detection electrodes are thus made same is advantageous in amplifying the induction voltage in the amplifier 9.

In more detail, when the two voltages input to the amplifier 9 have different waveforms, the frequency characteristic and the phase characteristic of the amplifier 9 are required to be set up so that the amplifier 9 simultaneously amplifies the two voltage signals having different waveforms. However, when the two voltage signals have the same waveform, the frequency characteristic and the phase characteristic can be very easily set up and optimized.

Eleventh embodiment

Figure 9C:
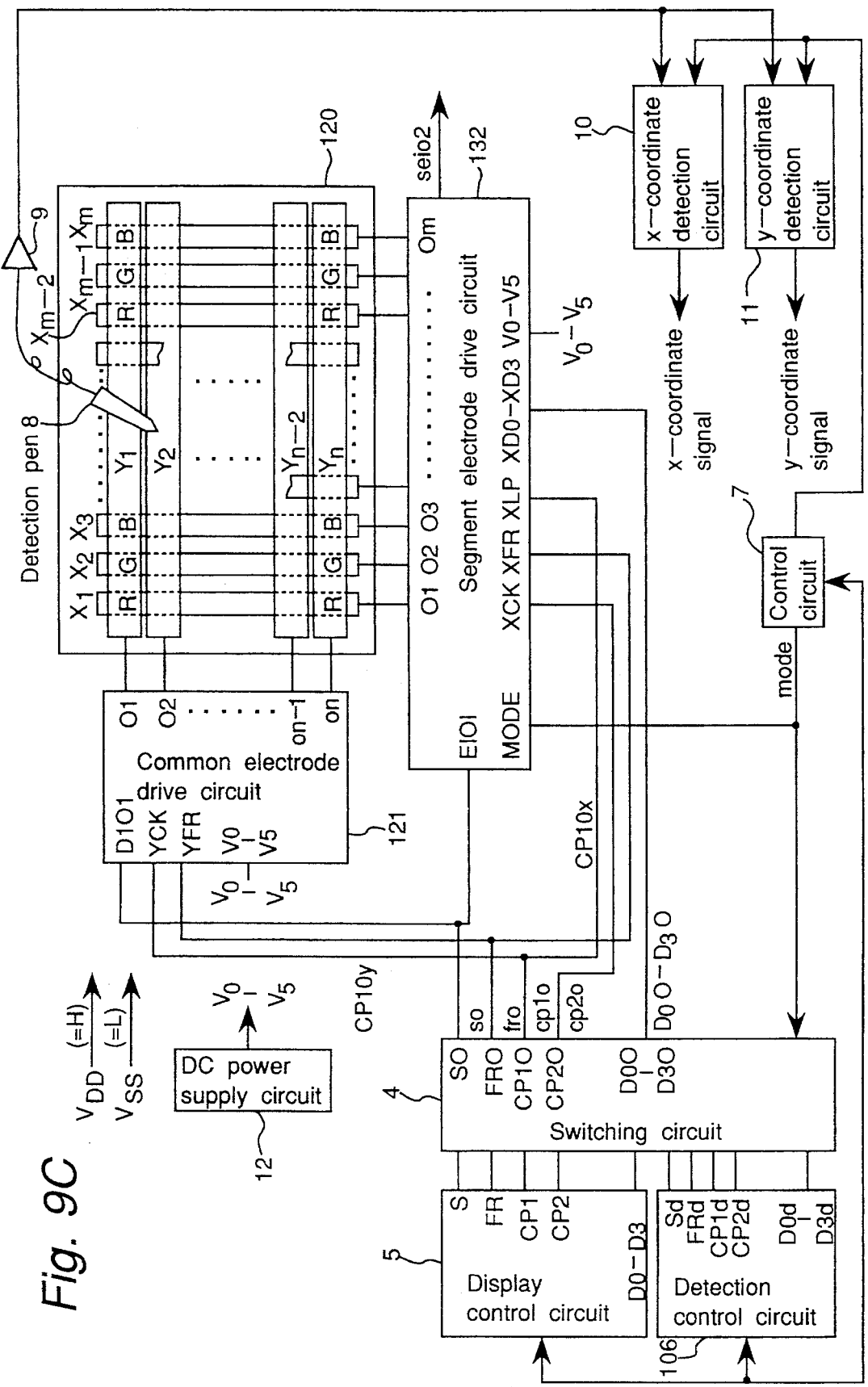
FIG. 9C is a block diagram of another embodiment.

FIGS. 9C and 11 are a block diagram of a display-integrated type tablet device in accordance with the eleventh embodiment and a timing chart of a segment electrode scanning signal x and a common electrode scanning signal y.

In the display-integrated type tablet device of the eleventh embodiment shown in FIG. 11, a clock signal cplo output from a switching circuit 4 in a coordinate detection period is made to be a clock signal having a single frequency. In scanning segment electrodes X having a higher electrode density, a segment electrode drive circuit 132 applies segment electrode scanning signals $x_1$ through $x_3$, ... having an identical waveform to adjoining three segment electrodes $X_1$ through $X_3$, ... at the same timing (i.e., the three segment electrodes X are simultaneously scanned by one clock). It is noted that the components shown in FIG. 9C are the same as those shown in FIG. 14 except for the segment electrode drive circuit 132, common electrode drive circuit 121, and LCD panel 120. The LCD panel 120 and the common electrode drive circuit 121 are the same as those shown in FIG. 9A.

Thus the scanning speed Sp in the x-direction is increased without increasing the frequency of the clock signal cplo in scanning the segment electrodes X.

Although it is feared that the x-coordinate detection accuracy is possibly degraded since three segment electrodes X are simultaneously scanned in the x-coordinate detection period, there is practically no problem because the electrode density of the segment electrodes X is approximately three times as great as the electrode density of the common electrodes Y to assure the approximately same scanning speed in detecting both coordinate values.

In the present embodiment, the scanning speed Sp is made identical in the x-direction and the y-direction, and the widths of the electrodes in the active state among both the electrodes X and Y are also made same. Therefore, the waveform of the voltage induced at the detection electrode of the detection pen 8 attributed to the scanning voltage $V_5$ applied to the segment electrodes X is made approximately equal to the waveform of the induction voltage attributed to the scanning voltage V5 applied to the common electrode Y.

Twelfth embodiment

Figure 12:
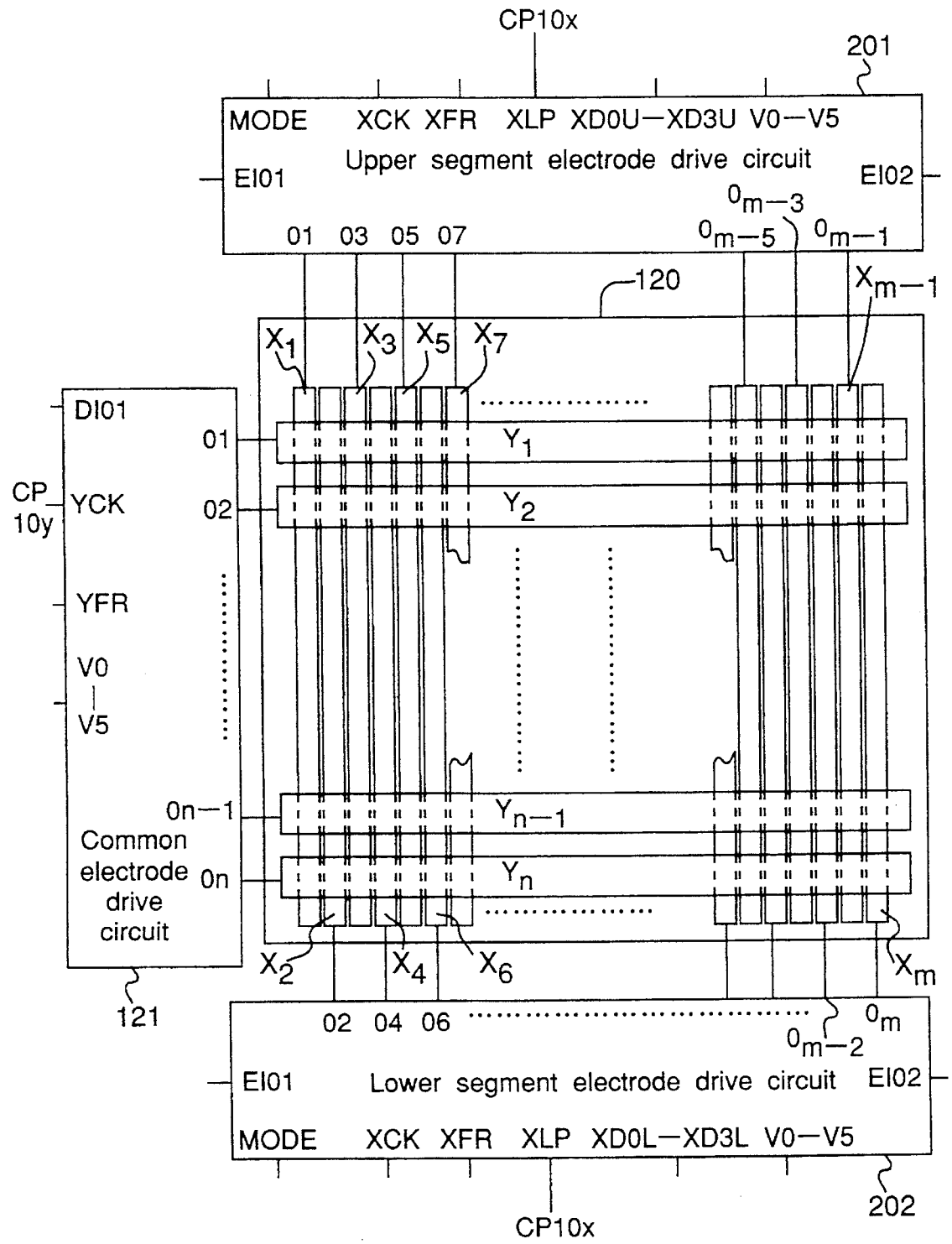
FIG. 12 is a view of an exemplified LCD panel for use in a display-integrated type tablet device in accordance with an embodiment of the present invention.

FIG. 12 is a block diagram of an LCD panel and a drive circuit therefor for use in a display-integrated type tablet device for color image display in accordance with a twelfth embodiment of the present invention.

The LCD panel of the present embodiment is the same as the LCD panel 120 shown in FIG. 20, where the segment electrodes X has an electrode density approximately three times as great as the electrode density of the common electrodes Y. The segment electrodes X are driven by two segment electrode drive circuits of an upper segment electrode drive circuit 201 and a lower segment electrode drive circuit 202. Note that the common electrodes Y are driven by one common electrode drive circuit 121 in the same manner as in the aforementioned embodiment.

The upper segment electrode drive circuit 201 and the lower segment electrode drive circuit 202 have the same construction which is substantially equal to the construction of the segment electrode drive circuit 122 of the ninth and tenth embodiments. Then the same signals are input to input terminals EI01, MODE, XCK, and XFR of both the segment electrode drive circuits 201 and 202 in the x-coordinate detection period.

In contrast to the above, output terminals O1 through O(m−1) of the upper segment electrode drive circuit 201 are connected to odd-number segment electrodes $X_1$, $X_3$, $X_5$, ..., $X_{m-1}$, while output terminals O2 through Om of the lower segment electrode drive circuit 202 are connected to even-number segment electrodes $X_2$, $X_4$, $X_6$, ..., $X_m$.

Thus by scanning the segment electrodes X by means of the two segment electrode drive circuits 201 and 202, the input terminals provided along a side of the LCD panel 120 can be reduced half in number even when the segment electrodes has for color image display an electrode density approximately three time as great as the electrode density in the case of displaying a monochrome image, which allows the electrodes to be easily connected to the segment electrode drive circuits 201 and 202.

Furthermore, when the scanning speed Sp in the x-direction and the y-direction is not required to be so fast in the coordinate detection period, the scanning speed Sp can be made same in the x-direction and the y-direction by inputting a segment electrode scanning clock signal $cplo_x$ having a frequency one and half times as great as that of the common electrode scanning clock signal cp1o$_y$ to the latch pulse input terminals XLP of both the segment electrode drive circuits 201 and 202 while shifting the signal by half clock in phase to allow the width of the electrodes in the active state of both the electrodes X and Y to be equal to each other.

However, when the scanning speed Sp in the x-direction and the y-direction is fast and the frequency of the clock signal cp1o is on the order of megahertz, a delay transmission line is problematically formed by the segment electrode X and the common electrode Y due to a distribution resistance R of segment electrode X, and a distribution electrostatic capacitance C taking place between the segment electrode X and the common electrode Y.

In more detail, the period from the time when the scanning voltage $V_S$ is applied to the segment electrode $X_1$ from the output terminal O1 of the upper segment electrode drive circuit 201 to the time when the scanning voltage $V_S$ is applied to the intersection region of the segment electrode $X_1$ and each of the common electrodes $Y_1$ through $Y_n$ is sequentially delayed due to the product of the distribution electrostatic capacitance C and the distribution resistance R (distribution CR). Consequently, a delay on the order of microsecond is generated from the time when the scanning voltages $V_S$ is applied to the intersection region of the segment electrodes $X_1$ and the common electrodes $Y_1$ located in position nearest to the upper segment electrode drive circuit 201 to the time when the scanning voltage $V_S$ is applied to the intersection region of the segment electrodes $X_1$ and the common electrode $Y_n$ located in position farthest from the upper segment electrode drive circuit 201.

Consequently, the time when a voltage is induced at the detection electrode of the detection pen 8 in detecting the x-coordinate value varies depending on the y-coordinate value even when the value of the x-coordinate at the tip end of the detection pen 8 is identical.

The above phenomenon also takes place when the scanning voltage $V_S$ is applied to the segment electrode X from the lower segment electrode drive circuit 202. Note that the direction of delay is reverse to the direction in the above case.

Here is now considered the case where the scanning voltage $V_S$ is applied from, for example, the output terminal O1 of the upper segment electrode drive circuit 201 to the segment electrode $X_1$, the scanning voltage $V_S$ is applied from the output terminal O2 of the lower segment electrode drive circuit 202 to the segment electrode $X_2$ after the elapse of a time corresponding to a half cycle of the segment electrode scanning clock signal cp1o$_x$, and the tip end of the detection pen 8 (refer to FIG. 20) is positioned at the boundary of the segment electrode $X_1$ and the segment electrode $X_2$.

When the tip end of the detection pen 8 is positioned in the vicinity of the common electrode $Y_1$, the delay period to the time when a voltage is induced at the detection electrode of the detection pen 8 when the segment electrode $X_l$ is scanned by the upper segment electrode drive circuit 201 differs from the delay period in the case where the segment electrode $X_2$ is scanned by the lower segment electrode drive circuit 202, which results in detecting two induction voltage waveforms at a certain interval of time in spite of the fact that both the segment electrodes $X_1$ and $X_2$ have been scanned approximately simultaneously.

The same phenomenon takes place when the tip end of the detection pen 8 is positioned in the vicinity of the common electrode $Y_n$ to result in detection of two induction voltage waveforms at a certain interval of time.

In other words, although one induction voltage waveform is obtained when the tip end of the detection pen 8 is positioned at the middle point in the y-direction where the two induction voltage waveforms are superposed on each other, two induction voltage waveforms are obtained at a certain interval of time in correspondence with the quantity of displacement of the tip end from the middle point in the y-direction in any other position.

Therefore, when the scanning speed Sp is required to be fast in the x-direction and the y-direction (i.e., the clock signal cp1o is required to have a high frequency) and a high coordinate detection accuracy is required, it is necessary to execute the x-coordinate detection by means of either one of both the segment electrode drive circuits 201 and 202 or execute the x-coordinate detection in different periods alternately by means of both the segment electrode drive circuits 201 and 202.

To the output terminals O1 through O(m−1) of the upper segment electrode drive circuit 201 or the output terminals O2 through Om of the lower segment electrode drive circuit 202 shown in FIG. 12, every other one of the segment electrodes $X_1$ through $X_m$ is alternately connected. However, the present embodiment is not limited to the above-mentioned arrangement. When the LCD panel 120 is an LCD panel for full color image display, the segment electrodes X may be connected to the segment electrode drive circuits 201 and 202 in blocks of the segment electrodes X for displaying three colors of R, G, and B adjacently arranged according to a manner as follows.

| Segment electrode | | Upper segment electrode drive circuit 201 |
|---|---|---|
| $X_1$, $X_2$, $X_3$ | → | Output terminal 01 |
| $X_7$, $X_8$, $X_9$ | → | Output terminal 03 |
| $X_{13}$, $X_{14}$, $X_{15}$ | → | Output terminal 05 |
| ... | | ... |

| Segment electrode | | Lower segment electrode drive circuit 202 |
|---|---|---|
| $X_4$, $X_5$, $X_6$ | → | Output terminal 02 |
| $X_{10}$, $X_{11}$, $X_{12}$ | → | Output terminal 04 |
| $X_{16}$, $X_{17}$, $X_{18}$ | → | Output terminal 06 |
| ... | | ... |

In the case of a simple type LCD panel which is not required to present a full color image display, the segment electrodes X may be connected to the segment electrode drive circuits 201 and 202 in blocks of the segment electrodes X for displaying two colors adjacently arranged.

Thirteenth embodiment

Figure 13:
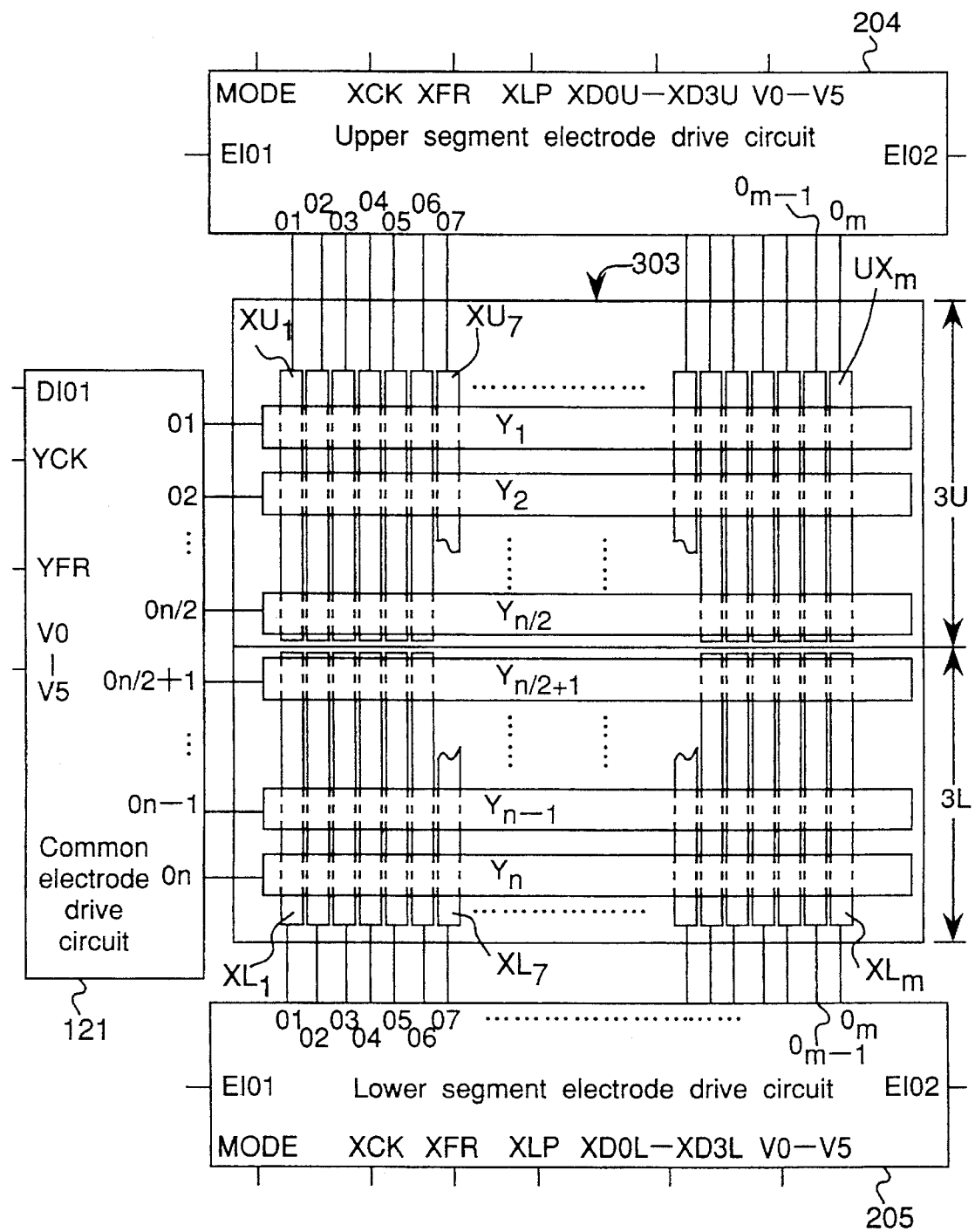
FIG. 13 is a view of an LCD panel different from the one shown in FIG. 12.

FIG. 13 is a block diagram of an LCD panel and a drive circuit therefor for use in a display-integrated type tablet device for color image display in accordance with the thirteenth embodiment of the present invention.

The LCD panel 303 of the present embodiment is the same as the LCD panel 120 shown in FIG. 20, where the segment electrodes X has an electrode density approximately three times as great as the electrode density of the common electrodes Y. The segment electrodes X are separated into two portions of upper-segment electrodes XU and lower segment electrodes XL, and the LCD panel 303 is separated into two portions of an upper LCD panel 3U composed of the upper segment electrodes XU and common electrodes Y1 through $Y_{n/2}$ and a lower LCD panel 3L composed of the lower segment electrode XL and common electrodes $Y_{n/2+1}$ through $Y_n$.

In other words, the LCD panel 303 of the present embodiment is a two-screen type LCD panel.

When the segment electrodes X of the LCD panel 303 having the above-mentioned construction are scanned in the coordinate detection period, the upper segment electrodes XU are scanned by an upper segment electrode drive circuit 204, while the lower segment electrodes XL are scanned by a lower segment electrode drive circuit 205 according to the same timing as in scanning the upper segment electrodes XU. Meanwhile, all the common electrodes $Y_1$ through $Y_n$ are sequentially scanned by one common electrode drive circuit 121 in the same manner as in the ninth, tenth, and eleventh embodiments.

In the above case, a segment electrode scanning clock signal $cplo_x$ as shown in FIG. 8 or 11 is input to latch pulse input terminals XLP of the upper segment electrode drive circuit 204 and lower segment electrode drive circuit 205, and shift data so as shown in FIG. 8 or 11 is input to a shift data input terminal EIO1. Meanwhile, a common electrode scanning clock signal $cplo_y$ as shown in FIG. 8 or 11 is input to the clock input terminal YCK of the common electrode drive circuit 121, and shift data so as shown in FIG. 8 or 11 is input to the shift data input terminal DIO1.

With the above-mentioned arrangement, segment electrode scanning signals $x_1$ through $x_m$ as shown in FIG. 8 or 11 are applied to the segment electrodes $X_1$ through $X_m$, and common electrode scanning signals $y_1$ through $Y_n$ as shown in FIG. 8 or 11 are applied to the common electrodes $Y_1$ through $Y_n$. Consequently, the scanning speed Sp in the x-direction and the width of the segment electrodes in the active state can be tripled.

Therefore, the scanning speed Sp in the x-direction and the width of the segment electrodes in the active state are put closer to the scanning speed Sp in the y-direction and the width of the common electrodes in the active state to allow the x-coordinate detection accuracy and the y-coordinate detection accuracy to be approximately equal to each other.

Since the segment electrodes X are separated into the upper segment electrodes XU and the lower segment electrodes XL, the distribution resistance R in each of the segment electrodes XU and XL can be reduced to allow the delay time of the voltage induced at the detection electrode of the detection pen 8 to be reduced in the x-coordinate detection period.

Therefore, the x-coordinate detection accuracy can be further increased.

In the above case, the segment electrode X and the common electrode Y are electrostatically coupled with each other. Therefore, when the electrode width of the segment electrode X is narrow as in the LCD panel 303, the resistance of the segment electrode X increases to result in increasing the voltage induced by the scanning voltage $V_5$ applied to the common electrode Y.

Therefore, in the two-section system duty type color LCD panel such as the LCD panel 303 of the present embodiment, the voltage induced at the segment electrode X attributed to the scanning voltage $V_5$ applied to the common electrode Y in the y-coordinate detection period changes at the boundary of the upper segment electrodes XU and the lower segment electrodes XL. Therefore, when the segment electrodes X are placed in a position higher than the common electrodes Y and the tip end of the detection pen 8 is placed at the boundary of the upper LCD panel 3U and the lower LCD panel 3L, the change of the voltage induced at the segment electrode X in the y-coordinate detection period is to be detected by the detection electrode of the detection pen 8, which results in significantly reduce the y-coordinate detection accuracy at and around the boundary of the upper LCD panel 3U and the lower LCD panel 3L.

Therefore, in the LCD panel 303 of the present embodiment, the common electrodes Y are placed in a position higher than the segment electrodes X in a manner as shown in FIG. 13 to reduce the influence of the voltage induced at the segment electrodes X in the y-coordinate detection period.

The frequencies and pulse widths of the segment electrode scanning clock signal $cplo_x$, common electrode scanning clock signal $cplo_y$, and the shift data so are not limited to the frequencies and pulse widths as shown in FIG. 8 or 11 in the present embodiment, and they are required to be appropriately determined so as to allow the optimum segment electrode scanning signal x and common electrode scanning signal y to be obtained.

In each of the aforementioned embodiments, the electrode density of the segment electrodes is made higher than that of the common electrodes, the above-mentioned arrangement is not limitative in the present invention.

As is evident from the above description, according to the display-integrated type tablet device of the first embodiment, the second clock signal having the frequency higher than the frequency of the first clock signal output from the display control circuit is generated in the clock generating section, and the line of the sync signal is switched in the line switching section in synchronization with the display image frame set up in the display control circuit. When writing display data into the display data storage section, the first clock signal which serves as the sync signal is input to the display data storage section. When reading the display data, the second clock signal serving as the sync signal is input to the display data storage section. Therefore, the time required for reading the display data of one display image frame from the display data storage section is shorter than the time required for writing the data to allow a display data reading time and an idle time to be provided in one display image frame period. Therefore, by operating the detection control circuit in the idle time, the coordinates pointed by the tip end of the detection pen on the display panel can be detected.

In other words, according to the present invention, a display-integrated type tablet device which can be driven by a display control circuit for the LCD panel having no tablet function can be provided.

According to the display-integrated type tablet device of the second embodiment, the display panel is separated into a plurality of blocks, and the segment electrode drive circuit and the common electrode drive circuit are respectively separated so that the segment electrodes and the common electrodes belonging to each block can be independently driven. Then an image is displayed in blocks of the display panel based on the control of the display control circuit, and a coordinate detection period is set up in the image display period in each block of the display panel based on the control of the detection control circuit. Therefore, detection of the coordinates at the tip end of the detection pen can be executed plural times in one display image frame period.

Therefore, according to the second embodiment, a display-integrated type tablet device which can execute high-accuracy coordinate detection at a high frequency without increasing the display image frame frequency can be provided.

According to the display-integrated type tablet device of the third embodiment, the shift data supply line is switched by the shift data supply line switching circuit. In the image display period, the shift data is input from the display control circuit to the shift data input terminals of each separated section of the segment electrode drive circuit and each separated section of the common electrode drive circuit for driving the electrodes belonging to the block in which an image is to be displayed on the display panel. In the coordinate detection period, the shift data is input to the shift data input terminals of each separated section of the segment electrode drive circuit and each separated section of the common electrode drive circuit for driving the electrodes belonging to a block located at an end of the display panel, while the shift data from the shift data output terminal in a separated section is input to the input terminal of the adjacent separated section. Therefore, an image can be displayed in blocks of the display panel in the image display period, while the segment electrodes and the common electrodes can be continuously scanned sequentially from the electrode located at an end to the electrode located at the other end on the display panel in the coordinate detection period set up in between the image display periods of each block.

Therefore, according to the third embodiment, a display-integrated type tablet device which can execute high-accuracy coordinate detection at a high frequency without increasing the display image frame frequency can be easily implemented.

According to the display-integrated type tablet device of the fourth embodiment, the display screen is composed of a plurality of display panels, and the segment electrode drive circuit and the common electrode drive circuit are provided for each of the display panels. Then an image is displayed in blocks constituting each of the display panels based on the control of the display control circuit, and the segment electrodes and the common electrodes of the display screen composed of the plural number of display panels are continuously scanned sequentially from the electrode located at an end of the display screen to the electrode located at the other end between the image display periods of blocks of the display panel based on the control of the detection control circuit. Therefore, the coordinate detection can be executed plural times in one display image frame.

Therefore, according to the third embodiment, a display-integrated type tablet device which can execute high-accuracy coordinate detection at a high frequency without increasing the display image frame frequency and have a large-size display screen or a high-resolution display screen can be provided.

According to the display-integrated type tablet device of the fifth embodiment, each of the segment electrode and the common electrode has a low electric resistance of 15 $\Omega/\square$, and therefore the propagation delay time of the scanning pulse in the segment electrode and the common electrode can be reduced.

Therefore, according to the fifth embodiment, a display-integrated type tablet device which can eliminate the distortion of the detection coordinates at the tip end of the detection pen can be provided.

According to the display-integrated type tablet device of the sixth embodiment, the scanning speed of the longer one of the segment electrode and the common electrode is made slower than the scanning speed of the shorter one of the electrodes, and therefore the ratio of the propagation delay time to a scanning cycle of the scanning pulse in the longer electrode can be relatively reduced.

Therefore, according to the sixth embodiment, a display-integrated type tablet device which can eliminate the distortion of the detection coordinates at the tip end of the detection pen can be provided.

In the above case, the frequency of scanning the segment electrode and the frequency of scanning the common electrode are made to be in a ratio of an integer, the coordinates pointed by the tip end of the detection pen on the display panel can be easily calculated.

According to the display-integrated type tablet device of the seventh embodiment, the display screen is composed of a plurality of display panels, and the segment electrode drive circuit and the common electrode drive circuit are provided for each of display panels. Then an image is displayed on the display screen composed of the plural number of display panels based on the control of the display control circuit, and the segment electrodes and the common electrodes of each display panel are continuously scanned sequentially from the electrode located at an end of the display screen to the electrode located at the other end based on the control of the detection control circuit. Therefore, the length of the segment electrode and the common electrode of each display panel can be reduced to reduce the electric resistance and consequently reduce the propagation delay time of the scanning pulse.

Therefore, according to the seventh embodiment, a display-integrated type tablet device which can eliminate the distortion of the detection coordinates at the tip end of the detection pen and have a large-size display screen or a high-resolution display screen can be provided.

According to the display-integrated type tablet device of the eighth embodiment, the segment electrodes driven by the first segment electrode drive circuit and the segment electrodes driven by the second segment electrode drive circuit arranged opposite to the first segment electrode drive circuit are arranged alternately. On the other hand, the common electrodes driven by the first common electrode drive circuit and the common electrodes driven by the second common electrode drive circuit arranged opposite to the first common electrode drive circuit are arranged alternately. Then an image is displayed on the display panel having the segment electrodes and the common electrodes driven by the drive circuits based on the control of the display control circuit, and the electrodes are continuously scanned sequentially from the electrode located at an end of the display panel to the electrode located at the other end based on the control of the detection control circuit. Therefore, the degree of delay in regard to the length of all the electrodes is averaged.

Therefore, according to the present invention, a display-integrated type tablet device which can eliminate the distortion of the detection coordinates at the tip end of the detection pen and have a large-size display screen or a high-resolution display screen can be provided.

According to the display-integrated type tablet device of the ninth embodiment, the detection control circuit is made to have the construction for controlling the segment electrode drive circuit and the common electrode drive circuit so that the number of scanning lines per unit time relevant to the electrodes having the higher electrode density among the segment electrodes and the common electrodes constituting the display panel is greater than the number of scanning lines per unit time relevant to the electrodes having the lower electrode density, and therefore the scanning speed in the x-direction is made to be approximately equal to the scanning speed in the y-direction.

Consequently, the waveform of the voltage induced at the detection electrode of the detection pen in the x-coordinate detection period and the waveform of the voltage induced at the detection electrode of the detection pen in the y-coordinate detection period are made approximately same, which allows the x-coordinate detection accuracy and the y-coordinate detection accuracy to be approximately equal to each other.

Therefore, according to the ninth embodiment, a high coordinate detection accuracy can be achieved even when the electrode density of one electrode of the display panel is greater than the electrode density of the other electrode thereof.

Furthermore, the number of electrodes to be scanned per unit time is made greater in scanning the electrodes having the higher electrode density among the segment electrodes and the common electrodes, which can prevent the increase of the scanning time (i.e., the increase of the coordinate detection period) due to the increase in number of the electrodes.

The above-mentioned arrangement can also prevent the possible deterioration of the display image quality due to the lowering of the duty ratio of the image display period attributed to the reduction of the image display period.

According to the display-integrated type tablet device of the tenth embodiment, the detection control circuit is made to have the construction for controlling the segment electrode drive circuit and the common electrode drive circuit so that the number of electrodes to be simultaneously scanned relevant to the electrodes having the higher electrode density among the segment electrodes and the common electrodes constituting the display panel is greater than that of the electrodes to be simultaneously scanned relevant to the electrodes having the lower electrode density, and therefore the width of electrodes in the active state is made approximately same in both the electrodes.

Consequently, the value of the voltage induced at the detection electrode of the detection pen in the x-coordinate detection period and the value of the voltage induced at the detection electrode of the detection pen in the y-coordinate detection period can be made approximately same, which allows the x-coordinate detection accuracy and the y-coordinate detection accuracy to be approximately equal to each other.

Therefore, according to the tenth embodiment, a high coordinate detection accuracy can be achieved even when the electrode density of one electrode of the display panel is greater than the electrode density of the other electrode. Furthermore, in the image display period, the possible deterioration of the display image quality due to the lowering of the duty ratio of the image display period can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit, a detection control circuit for sequentially scanning the first electrodes of the display panel by controlling the first drive circuit and sequentially scanning the second electrodes of the display panel by controlling the second drive circuit, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, the display-integrated type tablet device comprising:

a clock generating section which generates a second clock signal having a frequency higher than a frequency of a first clock signal output from the display control circuit;

a display data storage section into which display data of one display image frame is written in synchronization with an input sync signal and from which the written display data of one display image frame is read in synchronization with an input sync signal; and a line switching section which switches a line of a sync signal input to the display data storage section in synchronization with a display image frame set up by the display control circuit to input the first clock signal as the sync signal to the display data storage section in writing the display data into the display data storage section and input the second clock signal as the sync signal to the display data storage section in reading the display data from the display data storage section, wherein a time required for reading the display data of one display image frame from the display data storage section is made shorter than a time required for writing the display data of one display image frame into the display data storage section to provide a display data reading time and an idle time in one display image frame to thereby operate the detection control circuit in the idle time.

2. A display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit, a detection control circuit for sequentially scanning the first electrodes of the display panel by controlling the first drive circuit and sequentially scanning the second electrodes of the display panel by controlling the second drive circuit, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, the display-integrated type tablet device comprising:

a clock generating section which generates a second clock signal having a frequency higher than a frequency of a first clock signal output from the display control circuit; and a display data storage section into which display data is written in synchronization with an input sync signal and from which the written display data is read in synchronization with an input sync signal, wherein display data are input to the display data storage section according to the first clock signal which serves as the sync signal in writing the display data into the display data storage section and read from the display data storage section according to the second clock signal serving as the sync signal, in reading the display data from the display data storage section, and a time required for reading the display data from the display data storage section is made shorter than a time required for writing the display data transmitted from the display control circuit in a specified period into the display data storage section to provide a display data reading time and an idle time in the specified period to thereby operate the detection control circuit in the idle time.

3. A display-integrated type tablet device including a matrix-shaped display panel having first electrodes and second electrodes which are intersecting each other at right angles and a display material, a detection pen having at a tip end of the detection pen an electrode to be electrostatically coupled with the first electrodes and second electrodes of the display panel, a first drive circuit for driving the first electrodes, a second drive circuit for driving the second electrodes, a display control circuit for displaying an image on the display panel by controlling the first drive circuit and the second drive circuit in an image display period, a detection control circuit for sequentially scanning the first electrodes of the display panel by controlling the first drive circuit and sequentially scanning the second electrodes of the display panel by controlling the second drive circuit in a coordinate detection period, an x-coordinate detection circuit for detecting an x-coordinate at a position pointed by the tip end of the detection pen on the display panel according to a timing of generating an output signal from the detection pen and a timing of scanning the first electrodes, a y-coordinate detection circuit for detecting a y-coordinate at a position pointed by the tip end of the detection pen on the display panel according to a timing of generating an output signal from the detection pen and a timing of scanning the second electrodes, wherein the first drive circuit is composed of two first drive circuits of a first first drive circuit and a second first drive circuit where the first first drive circuit and the second first drive circuit are arranged opposite to each other with interposition of the display panel, the second drive circuit is composed of two second drive circuits of a first second drive circuit and a second second drive circuit where the first second drive circuit and the second second drive circuit are arranged opposite to each other with interposition of the display panel, the first electrodes driven by the first first drive circuit and the first electrodes driven by the second first drive circuit are arranged alternately with each other while the second electrodes driven by the first second drive circuit and the second electrodes driven by the second second drive circuit are arranged alternately with each other, the display control circuit controls the drive circuits so as to display an image on the display panel having the first electrodes and the second electrodes driven by the first first drive circuit, the second first drive circuit, the first second drive circuit, and the second second drive circuit, and the detection control circuit controls the first first drive circuit, the second first drive circuit, the first second drive circuit, and the second second drive circuit so as to continuously scan the electrodes sequentially from an electrode located at an end of the display panel to an electrode located at the other end of the display panel.

4. A display-integrated type tablet device as claimed in claim 2, wherein the display data storage section is a semiconductor memory provided with a data input terminal and a data output terminal, and display data output from the output terminal is output after an elapse of a specified delay time according to input sequence of the display data input from the input terminal.

5. A display-integrated type tablet device as claimed in claim 4, wherein the display data storage section has a storage capacity smaller than a capacity of the number of display pixels in one frame of the display panel.

\* \* \* \* \*